United States Patent
Ayatsuka et al.

(10) Patent No.: US 7,406,323 B2
(45) Date of Patent: Jul. 29, 2008

(54) COMMUNICATION SYSTEM AND METHOD, INFORMATION PROCESSING TERMINAL AND METHOD, AND INFORMATION PROCESSING APPARATUS AND METHOD

(75) Inventors: Yuji Ayatsuka, Tokyo (JP); Haruo Oba, Kanagawa (JP)

(73) Assignee: Sony Corporation, Tokyo (JP)

( * ) Notice: Subject to any disclaimer, the term of this patent is extended or adjusted under 35 U.S.C. 154(b) by 969 days.

(21) Appl. No.: 10/465,958

(22) PCT Filed: Oct. 28, 2002

(86) PCT No.: PCT/JP02/11169

§ 371 (c)(1),
(2), (4) Date: Jun. 27, 2003

(87) PCT Pub. No.: WO03/038635

PCT Pub. Date: May 8, 2003

(65) Prior Publication Data

US 2004/0092231 A1    May 13, 2004

(30) Foreign Application Priority Data

Nov. 1, 2001    (JP) .................................... 2001-336619

(51) Int. Cl.
*G06F 7/20* (2006.01)
(52) U.S. Cl. ................. 455/461; 455/456.1; 455/456.3; 455/457
(58) Field of Classification Search ................... 455/412
See application file for complete search history.

(56) References Cited

U.S. PATENT DOCUMENTS

| | | | |
|---|---|---|---|
| 5,959,530 A * | 9/1999 | Lupien et al. ............ 340/568.1 |
| 6,108,790 A | 8/2000 | Moriya et al. | |
| 6,490,680 B1 * | 12/2002 | Scheidt et al. ............... 713/166 |
| 6,615,175 B1 * | 9/2003 | Gazdzinski ................. 704/275 |
| 6,759,072 B1 * | 7/2004 | Gutwein et al. ............. 426/433 |
| 6,832,459 B2 * | 12/2004 | Russell ..................... 52/745.05 |
| 6,912,398 B1 * | 6/2005 | Domnitz ..................... 455/461 |
| 2002/0055848 A1 | 5/2002 | Jae et al. | |
| 2002/0194477 A1 | 12/2002 | Arakawa et al. | |

FOREIGN PATENT DOCUMENTS

JP    6-266671    9/1994

(Continued)

*Primary Examiner*—Creighton H Smith
(74) *Attorney, Agent, or Firm*—Finnegan, Henderson, Farabow, Garrett & Dunner, L.L.P.

(57) ABSTRACT

The present invention relates to a communication system and method, an information processing terminal and method, and an information processing device and method which enable simple and secure restricted access. When a PDA 11 is brought close, a reader 2 of a personal computer 1 reads a device ID form an IC tag 12. The personal computer 1 registers device IDs on a connection permission list, and permits only devices registered on the list to connect. When being instructed to perform accessing, the PDA 11 controls a communication unit to access the personal computer 1 and to transmits its device ID. The personal computer 1 determines whether or not the transmitted ID is registered on the connection permission list, and permits the connection when determining that the ID is registered. The present invention can be applied to various information processing devices such as a personal computer and a PDA.

3 Claims, 24 Drawing Sheets

FOREIGN PATENT DOCUMENTS

| | | |
|---|---|---|
| JP | 7-160638 | 6/1995 |
| JP | 11-296481 | 10/1999 |
| JP | 2001-223691 | 8/2001 |
| JP | 2001-230699 | 8/2001 |
| KR | 2001 008 101 | 2/2001 |
| WO | WO 01/55842 | 8/2001 |

* cited by examiner

COMMUNICATION SYSTEM AND METHOD, INFORMATION PROCESSING TERMINAL AND METHOD, AND INFORMATION PROCESSING APPARATUS AND METHOD

TECHNICAL FIELD

The present invention relates to communication systems and methods, information processing terminals and methods, and information processing devices and methods, and in particular, to a communication system and method, an information processing terminal and method, and an information processing device and method that enable simple and secure restricted access.

BACKGROUND ART

With the recent developments in communication technology, users have come to obtain required information by using various communication devices to access a predetermined server, regardless of the location of the users and the time of day. Users can confirm required information anytime by using, for example, cellular phones, PDAs (Personal Digital Assistants), etc.

For the administrator of the server, it may be required to restrict free access to the server. In this case, for example, it is common that the IP addresses of devices which are allowed to access the server are registered beforehand, and users accessing the server are requested to input passwords.

By way of example, when predetermined information is delivered only to persons gathering for an event, access is restricted by registering beforehand the addresses of devices used by those persons.

However, in order to restrict access, in the case of registering beforehand the IP addresses of all the devices for which the server allows access, a problem occurs in that the operation is very complicated.

Although such a problem does not occur when the number of the devices allowed to access is relatively small, when the number is as large as several hundred or several thousand, the operation of registering the IP addresses of all the devices becomes very difficult.

In addition, as described above, when access is restricted by requesting users to input passwords notified to them beforehand, there is a possibility that some users may forget their passwords. Also, even if the users remember the passwords, they are inconvenienced by having to input their passwords, which is a problem.

DISCLOSURE OF INVENTION

The present invention is made in view of the above circumstances, and enables simple and secure restricted access.

An information processing terminal for a first communication system of the present invention comprises a providing means for providing, by means of wireless communication, identification information of the information processing terminal to an information processing device positioned nearby, and a first communication means for performing wired or wireless communication with the information processing device. When an instruction to connect to the information processing device is given, the first communication means transmits the identification information to the information processing device, and performs communication when communication is permitted by the information processing device based on the transmitted identification information. An information processing device comprises an acquiring means for acquiring the identification information by wireless communication from the information processing terminal, which is positioned nearby, a second communication means for performing wired or wireless communication with the information processing terminal, and a storage means for storing the identification information acquired by the acquiring means. When the second communication means receives the identification information from the information processing terminal, and it is determined that the received identification information is identical to the identification information stored in the storage means, the second communication means performs communication with the information processing terminal.

A communication method for a first communication system of the present invention includes a providing step for providing identification information of the information processing terminal by wireless communication to an information processing device positioned nearby, and a first communication step for performing wired or wireless communication with the information processing device. When an instruction to connect to the information processing device is given, the identification information is transmitted to the information processing device, and communication is performed when communication is permitted by the information processing device based on the transmitted identification information. The communication method includes an acquiring step for acquiring the identification information by wireless communication from an information processing terminal positioned nearby, a second communication step for performing wired or wireless communication with the information processing terminal, and a storage step for storing the identification information acquired by the acquiring step. When the identification information is received from the information processing terminal, and it is determined that the received identification information is identical to the identification information stored by the storage step, the communication with the information processing terminal is performed.

A first information processing terminal of the present invention comprises a providing means for providing identification information of the information processing terminal by wireless communication to an information processing device positioned nearby, and a communication means for performing wired or wireless communication with the information processing device. When an instruction to connect to the information processing device is given, the communication means transmits the identification information to the information processing device, and performs communication when communication is permitted by the information processing device based on the transmitted identification information.

The information processing terminal further comprises a storage means for storing communication information for performing communication with the information processing device. Based on the communication information stored in the storage means, the communication means accesses the information processing device and transmits the identification information.

An information processing method for a first information processing terminal of the present invention includes a providing step for providing identification information of the information processing terminal by wireless communication to an information processing device positioned nearby, and a communication step for performing wired or wireless communication with the information processing device. When an instruction to connect to the information processing device is given, the identification information is transmitted to the information processing device, and communication is performed when communication is permitted by the information processing device based on the transmitted identification information.

A program of the present invention includes a provision control step for controlling provision of identification information of one side by wireless communication to an information processing device positioned nearby, and a communication control step for controlling wired or wireless communication with the information processing device, and causes a computer to execute transmitting identification information to the information processing device when an instruction to connect to the information processing device is given, and performing communication when communication is permitted by the information processing device based on the transmitted identification information.

A first information processing device of the present invention comprises an acquiring means for acquiring first identification information by wireless communication from an information processing terminal positioned nearby, a communication means for performing wired or wireless communication with the information processing terminal, and a storage means for storing the first identification information acquired by the acquiring means. When the communication means receives second identification information from the information processing terminal, and it is determined that the received second identification information is identical to the first identification information stored in the storage means, the communication means performs communication with the information processing terminal.

The storage means can delete the first identification information when a predetermined period passes after the first identification information is stored.

An information processing method for a first information processing device of the present invention includes an acquiring step for acquiring first identification information by wireless communication from an information processing terminal positioned nearby, a communication step for performing wired or wireless communication with the information processing terminal, and a storage step for storing the first identification information acquired by the acquiring step. When second identification information is received from the information processing terminal, and it is determined that the received second identification information is identical to the first identification information stored by the processing of the storage step, communication with the information processing terminal is performed.

A program of the present invention includes an acquisition control step for controlling acquisition by wireless communication of first identification information from an information processing terminal positioned nearby, a communication control step for controlling wired or wireless communication with the information processing terminal, and a storage control step for controlling storage of the first identification information acquired by the processing of the acquisition control step, and causes a computer to execute performing communication with the information processing terminal when second identification information is received from the information processing terminal and it is determined that the received second identification information is identical to the first identification information stored by the processing of the storage control step.

An information processing terminal for a second communication system of the present invention comprises an acquiring means for acquiring, from the information processing device positioned nearby, communication information for performing communication with the information processing device by wireless communication, and a password, and a first communication means for performing wired or wireless communication with the information processing device. When an instruction to connect to the information processing device is given, the first communication means accesses the information processing device based on the communication information acquired by the acquiring means, transmits the password to the information processing device, and performs communication when communication is permitted by the information processing device based on the transmitted password. An information processing device comprises a providing means for providing predetermined information by wireless communication to an information processing terminal positioned nearby, a second communication means for performing wired or wireless communication to the information processing terminal, and a storage means for storing the communication information for performing communication by the second communication means, and the password. The providing means provides, as the information, the communication information and password stored in the storage means to the information processing terminal. The second communication means performs communication with the information processing terminal when receiving the password transmitted from the information processing terminal, and it is determined that the received password is identical to the password stored in the storage means.

A communication method for a second communication system of the present invention includes an acquiring step for acquiring, from an information processing device positioned nearby, communication information for performing communication with the information processing device by wireless communication, and a password, and a first communication step for performing wired or wireless communication with the information processing device. When an instruction to connect to the information processing device is given, the information processing device is accessed based on the communication information acquired by the processing of the acquiring step, the password is transmitted to the information processing device, and communication is performed when communication is permitted by the information processing device based on the transmitted password. The method includes a providing step for providing predetermined information by wireless communication to an information processing terminal positioned nearby, a second communication step for performing wired or wireless communication to the information processing terminal, and a storage step for storing the communication information for performing communication by the processing of the second communication step and the password. The communication information and password stored by the processing of the storage step are provided as the information to the information processing terminal. When the password transmitted from the information processing terminal is received, and it is determined that the received password is identical to the password stored by the processing of the storage step, communication with the information processing terminal is performed.

A second information processing terminal of the present invention comprises an acquiring means for acquiring, from the information processing device positioned nearby, communication information for performing communication with the information processing device by wireless communication, and a password and a communication means for performing wired or wireless communication with the information processing device. When an instruction to connect to the information processing device is given, the communication means accesses the information processing device based on the communication information acquired by the acquiring means, transmits the password to the information processing device, and performs communication when communication is permitted by the information processing device based on the transmitted password.

A second information processing method of the present invention for an information processing terminal includes an acquiring step for acquiring, from an information processing device positioned nearby, communication information for performing communication with an information processing device by wireless communication and a password, and a communication step for communicating with the information processing device by wire or wireless. When an instruction to connect to the information processing device is given, the information processing device is accessed based on the communication information acquired by the processing of the acquiring step, the password is transmitted to the information processing device, and communication is performed when communication is permitted by the information processing device based on the transmitted password.

A program of the present invention includes an acquisition control step for controlling acquisition, from an information processing device positioned nearby, of communication information for performing communication with an information processing device by wireless communication, and a password, and a communication control step for controlling wired or wireless communication with the information processing device. The program causes a computer to execute accessing the information processing device based on the communication information acquired by the processing of the acquisition control step when an instruction to connect to the information processing device is given, transmitting the password to the information processing device, and performing communication when communication is permitted by the information processing device based on the transmitted password.

A second information processing device of the present invention comprises a providing means for providing predetermined information by wireless communication to an information processing terminal positioned nearby, a communication means for performing communication with an information processing terminal by wire or wireless, and a storage means for storing communication information for performing communication by the communication means and a first password. The providing means provides, as the information, the communication information and first password stored in the storage means to the information processing terminal, and the communication means performs communication with the information processing terminal when receiving a second password transmitted from the information processing terminal, and it is determined that the received second password is identical to the first password.

The storage means can change the first password in a predetermined cycle.

An information processing method for a second information processing device of the present invention includes a providing step for providing predetermined information by wireless communication to an information processing terminal positioned nearby, a communication step for performing wired or wireless communication with the information processing terminal, and a storage step for storing communication information for performing communication by the communication step and a first password. The communication information and first password stored by the processing of the storage step are provided as the information to the information processing terminal, and when a second password transmitted from the information processing terminal is received and it is determined that the received second password is identical to the first password, communication with the information processing terminal is performed.

A program of the present invention includes a provision control step for controlling provision by wireless communication of predetermined information to an information processing terminal positioned nearby, a communication control step for controlling wired or wireless communication with the information processing terminal, and a storage control step for controlling storage of communication information for performing communication by the processing of the communication control step and a first password. The program causes a computer to execute providing, as the information, the communication information and first password stored by the processing of the storage control step to the information processing terminal, and performing communication with the information processing terminal when a second password transmitted from the information processing terminal is received and it is determined that the received second password is identical to the first password.

An information processing terminal for a third communication system of the present invention comprises a first providing means for providing identification information of the information processing terminal by wireless communication to an information processing device positioned nearby, a first acquiring means for acquiring, from the information processing device, communication information for performing communication with the information processing device and a password, and a first communication means for performing wired or wireless communication with the information processing device. When an instruction to connect to the information processing device is given, the first communication means accesses the information processing device based on the communication information acquired by the first acquiring means, transmits the identification information and the password to the information processing device, and performs communication when communication is permitted by the information processing device based on the transmitted identification information and password. An information processing device comprises an second providing means for providing predetermined information by wireless communication to an information processing terminal positioned nearby, a second acquiring means for acquiring the identification information from the information processing terminal by wireless communication, a first storage means for storing the identification information acquired by the second acquiring means, a second communication means for performing wired or wireless communication with the information processing terminal, and a second storage means for storing the communication information for performing communication by the second communication means and the password. The second providing means provides, as the information, the communication information and password stored in the second storage means to the information processing terminal. The second communication means performs communication with the information processing terminal when receiving the identification information and password transmitted from the information processing terminal, and it is determined that the received identification information is identical to the identification information stored in the first storage means and it is determined that the received password is identical to the password stored in the second storage means.

A communication method for a third communication system of the present invention includes a first providing step for providing identification information of an information processing terminal by wireless communication to an information processing device positioned nearby, a first acquiring step for acquiring, from the information processing device, communication information for performing communication with the information processing device and a password, and a first communication step for performing wired or wireless communication with the information processing device. When an instruction to connect to the information processing device is given, the information processing device is accessed based on the communication information acquired by the processing of the first acquiring step, the identification information and the password are transmitted to the information processing device, and communication is performed when communication is permitted based on the transmitted identification information and password. An information processing method for an information processing device includes a second providing step for providing predetermined information by wireless communication to an information processing terminal positioned nearby, a second acquiring step for acquiring the identification information from the information processing terminal by wireless communication, a first storage step for storing the identification information acquired by the processing of the second acquiring step, a second communication step for performing wired or wireless communication to the information processing terminal, and a second storage step for storing the communication information for performing communication by the processing of the second communication step and the password. The communication information and password stored by the processing of the second storage step are provided as the information to the information processing terminal, and when the identification information and password transmitted from the information processing terminal are received, and it is determined that the received identification information is identical to the identification information stored by the processing of the first storage step and it is determined that the received password is identical to the password stored by the processing of the second storage step, communication with the information processing terminal is performed.

A third information processing terminal of the present invention comprises a providing means for providing identification information of an information processing terminal by wireless communication to an information processing device positioned nearby, an acquiring means for acquiring, from the information processing device, the communication information for performing communication with the information processing device by wireless communication, and a communication means for performing wired or wireless communication with the information processing device. When an instruction to connect to the information processing device is given, the communication means accesses the information processing device based on the communication information acquired by the acquiring means, transmits the identification information and the password to the information processing device, and performs communication when communication is permitted by the information processing device based on the transmitted identification information and password.

An information processing method for a third information processing terminal for the present invention includes a providing step for identification information of one side to an information processing device positioned nearby, an acquiring step for acquiring, from the information processing device, communication information for performing communication with an information processing device by wireless communication, and a password, and a communication step for performing wired or wireless communication with information processing device. When an instruction to connect to the information processing device is given, the information processing device is accessed based on the communication information acquired by the processing of the acquiring step, the identification information and the password are transmitted to the information processing device, and communication is performed when communication is permitted by the information processing device based on the transmitted identification information and password.

A program of the present invention comprises a provision control step for controlling provision by wireless communication of identification information of one side to an information processing device positioned nearby, an acquisition control step for controlling acquisition from an information processing device by wireless communication of communication information for performing communication with the information processing device and a password, and a communication control step for controlling wired or wireless communication with the information processing device. The program causes a computer to execute accessing the information processing device based on the communication information acquired by the processing of the acquisition control step when an instruction to connect to the information processing device is given, transmitting the identification information and the password to the information processing device, and performing communication when communication is permitted by the information processing device based on the transmitted identification information and password.

A third information processing device of the present invention comprises a providing means for providing predetermined information by wireless communication to an information processing terminal positioned nearby, an acquiring means for acquiring, from an information processing terminal, first identification information by wireless communication, a first storage means for storing the first identification information acquired by the acquiring means, a communication means for performing wired or wireless communication with the information processing terminal, and a second storage means for storing communication information for performing communication by the communication means and a first password. The providing means provides, as the information, the communication information and first password stored in the second storage means to the information processing terminal, and the communication means performs communication with the information processing terminal when receiving the second identification information and second password transmitted from the information processing terminal, and it is determined that the received second identification information is identical to the first identification information stored in the first storage means and it is determined that the received second password is identical to the first password.

The first storage means can delete the first identification information when a predetermined period passes after the first identification information is stored.

The second storage means can change the first password in a predetermined cycle.

An information processing method for a third information processing device of the present invention for an information processing device includes a providing step for providing predetermined information by wireless communication to an information processing terminal positioned nearby, an acquiring step for acquiring first identification information from an information processing terminal by wireless communication, a first storage step for storing the first identification information acquired by the processing of the acquiring step, a communication step for performing wired or wireless communication with the information processing terminal, and a second storage step for storing communication information for performing communication by the processing of the communication step, and a first password. The communication information and first password stored by the processing of the second storage step are provided as the information to the information processing terminal. When the second identification information and second password transmitted from the information processing terminal are received, and it is determined that the received second identification information is identical to the first identification information stored by the processing of the first storage step and it is determined that the received second password is identical to the first password, communication with the information processing terminal is performed.

A program of the present invention includes a provision control step for controlling provision of predetermined information by wireless communication with an information processing terminal positioned nearby, an acquisition control step for controlling acquisition by wireless communication of first identification information from an information processing terminal, a storage control step for controlling storage of the first identification information acquired by the processing of the acquisition control step, a communication control step for controlling wired or wireless communication with the information processing terminal, and a second storage control step for controlling storage of communication information for performing communication by the processing of the communication control step and the first password. The program executes a computer to execute providing, as the information, the communication information and first password stored by the processing of the second storage control step, and performing communication with the information processing terminal when the second identification information and second password transmitted from the information processing terminal are received, and it is determined that the received second identification information is identical to the first identification information stored by the processing of the first storage control step and it is determined that the received second password is identical to the first password.

In a first communication system and method of the present invention, when an information processing terminal provides, by wireless communication, identification information of the terminal to an information processing device positioned nearby, performs communication by wire or wireless, and is instructed to connect to the information processing device, the identification information is transmitted to the information processing device, and communication is performed when communication is permitted by the information processing device based on the transmitted identification. Also, the identification information is acquired from the information processing terminal, which is positioned nearby, communication with the information processing terminal is performed by wire or wireless, and the acquired identification information is stored. When the identification information is received from the information processing terminal, and it is determined that the received identification information is identical to the stored identification information, communication with the information processing terminal is performed.

In a first information processing terminal, method, and program of the present invention, identification information of the terminal is provided by wireless communication to an information processing device positioned nearby, and communication with the information processing device is performed by wire or wireless. Also, when an instruction to connect to the information processing device is given, the identification information is transmitted to the information processing device, and communication is performed when communication is permitted by the information processing device based on the transmitted identification information.

In a first information processing device, method, and program of the present invention, first identification information is acquired by wireless communication from an information processing terminal positioned nearby, communication with the information processing terminal is performed by wire or wireless, and the acquired first identification information is stored. Also, when second identification information is received from the information processing terminal, and it is determined that the received second identification information is identical to the first identification information, communication with the information processing terminal is performed.

In a second communication system and method of the present invention, from an information processing device positioned nearby, communication information for performing communication with the information processing device by wireless communication and a password are acquired by an information processing terminal, and communication with the information processing device is performed by wire or wireless. Also, when an instruction to connect to the information processing device is given, the information processing device is accessed based on the acquired communication information, the password is transmitted to the information processing device, and communication is performed when it is permitted by the information processing device based on the transmitted password. In addition, the information processing device provides predetermined information by wireless communication to an information processing terminal positioned nearby, and communication with the information processing terminal by wire or wireless, and the communication information for performing communication and the password are stored. The stored communication information and password are provided to the information processing terminal. When the password transmitted from the information processing terminal is received, and it is determined that the received password is identical to the stored password, communication with the information processing terminal is performed.

In a second information processing terminal, method, and program of the present invention, from an information processing device positioned nearby, communication information for performing communication with the information processing device and a password are acquired by wireless communication, and communication with the information processing device is performed by wire or wireless. Also, when an instruction to connect to the information processing device is given, the information processing device is accessed based on the acquired communication information, the password is transmitted to the information processing device, and communication is performed when it is permitted based on the transmitted password.

In a second information processing device, method, and program of the present invention, predetermined information is provided by wireless communication to an information processing terminal positioned nearby, communication with the information processing terminal is performed by wire or wireless, and communication information for performing communication and a first password are stored. The stored communication information and first password are provided to the information processing terminal. When a second password transmitted from the information processing terminal is received, and it is determined that the received second password is identical to the first password, communication with the information processing terminal is performed.

In a third information processing terminal, method, and program of the present invention, identification information of an information processing terminal is provided by wireless communication from the information processing terminal to an information processing device positioned nearby, communication information for performing communication with the information processing device is acquired from the information processing device by wireless communication, and communication with the information processing device is performed by wire or wireless. When an instruction to connect to the information processing device is given, the information processing device is accessed based on the acquired communication information, the communication information and the password are transmitted to the information processing device, and communication is performed when communication is permitted based on the transmitted communication information and password. In addition, predetermined information is provided by wireless communication from an information processing device to the information processing terminal, which is positioned nearby. From the information processing terminal, identification information is acquired by wireless communication, and the acquired identification information is stored. Wired or wireless communication with the information processing terminal is performed, and communication information for performing communication and a password are stored. Also, the stored communication information and password are provided to the information processing terminal. When communication information and password transmitted from the information processing terminal are received, and it is determined that the received identification information is identical to the stored identification information and it is determined that the received password is identical to the stored password, communication with the information processing terminal is performed.

In a third information processing terminal, method, and program of the present invention, identification information of the terminal is provided by wireless communication to an information processing device positioned nearby, communication information for performing communication with the information processing device and a password are acquired from the information processing device, and communication with the information processing device is performed by wire or wireless. Also, when an instruction to connect to the information processing device is given, the information processing device is accessed based on the acquired identification information, the identification information and the password are transmitted to the information processing device, and communication is performed when it is permitted by the information processing device based on the transmitted identification information and password.

In a third information processing device, method, and program of the present invention, predetermined information is provided by wireless communication to an information processing terminal positioned nearby, first identification information is acquired from the information processing terminal by wireless communication. The acquired first identification information is stored and communication with the information processing terminal is performed by wire or wireless, and communication information for performing communication and a first password are stored. The stored communication information and first password are provided to the information processing terminal. When second identification information and a second password, transmitted from the information processing terminal, are received, and it is determined that the received second identification information is identical to the stored first identification information and it is determined that the received second password is identical to the first password, communication with the information processing terminal is performed.

BEST MODE FOR CARRYING OUT THE INVENTION

Figure 1:
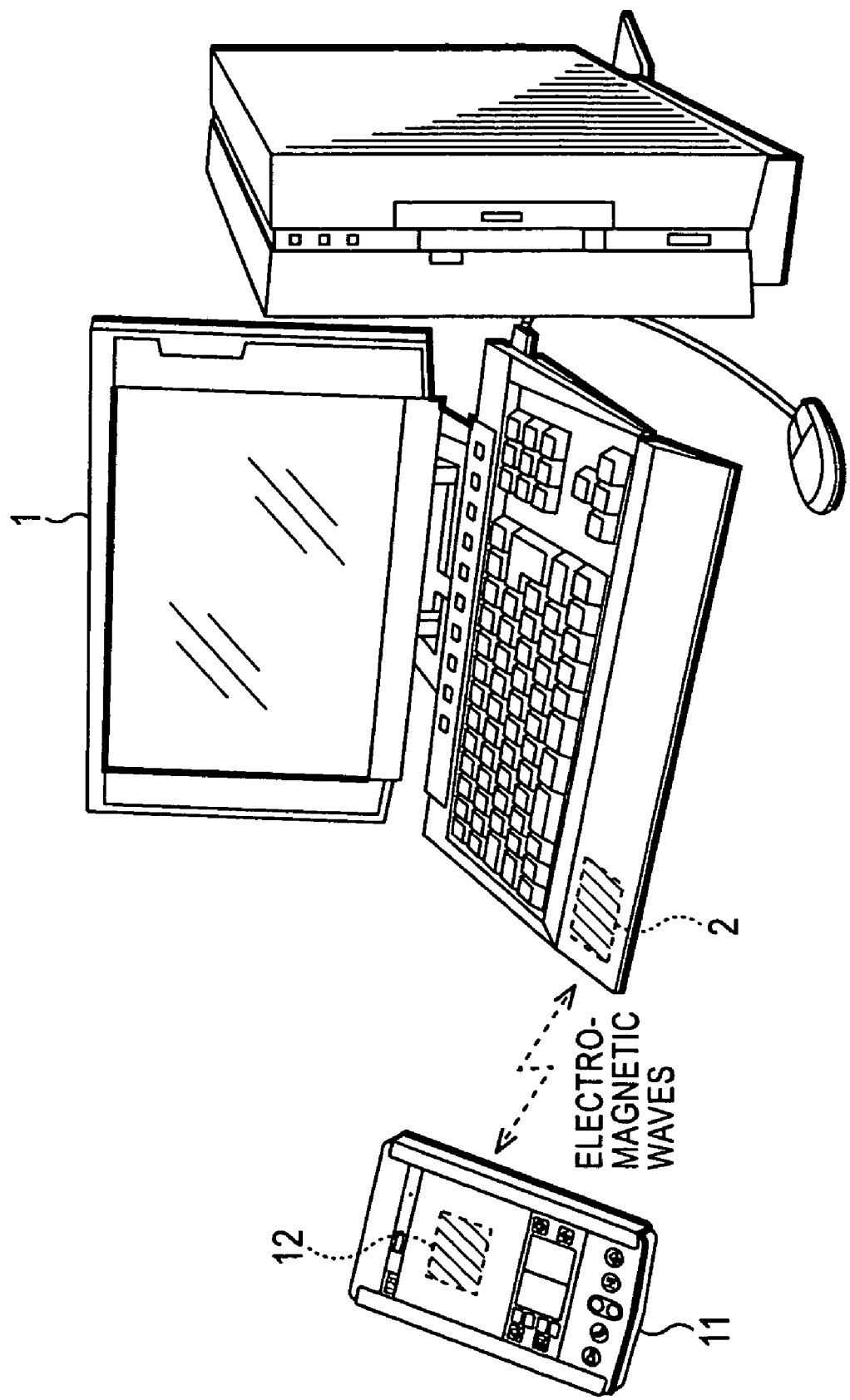
FIG. 1 is an illustration of an example of a communication system to which the present invention is applied.

FIG. 1 is an illustration of an example of a communication system to which the present invention is applied.

When a PDA (Personal Digital Assistants) 11 is brought close to a personal computer 1, the personal computer 1 acquires information stored on an IC tag 12 of the PDA 11 by using electromagnetic waves radiated from a reader 2, as indicated by the dashed line in FIG. 1.

As the information stored on the IC tag 12, the personal computer 1 acquires, for example, a device ID such as an IP address or a Bluetooth™address which is uniquely set in the PDA 11.

The personal computer 1 restricts access by using the device ID acquired by the reader 2.

Specifically, the personal computer 1 and the PDA 11 include communication units (a communication unit 29 (see FIG. 2), and a communication unit 89 (see FIG. 4)) that perform wired or wireless communication, respectively. When the PDA 11 requests the personal computer 1 to perform communication using its communication unit, the personal computer 1 requests the PDA 11 to first transmit the device ID.

In response to this request, the PDA 11 transmits its device ID to the personal computer 1 from the communication unit 89.

When receiving the device ID transmitted from the PDA 11, the personal computer 1 determines whether or not the received device ID is identical to that acquired beforehand by the reader 2. If the personal computer 1 has determined that the received device ID is identical, it allows communication by the communication 29, that is, a connection.

Accordingly, if another device other than the PDA 11 requests a connection to the personal computer 1, since the device ID is not recorded in the personal computer 1 beforehand, the device cannot communicate with the personal computer 1.

By way of example, when the personal computer 1 is installed as a server for delivering predetermined information in an event place, persons gathering in the place simply bring their own devices (device having built-in tags) close to the personal computer 1, whereby, after that, they can access the personal computer 1 and can acquire information. In other words, persons who do not bring their own devices close the personal computer 1 cannot access the personal computer 1, and cannot acquire any information.

Figure 2:
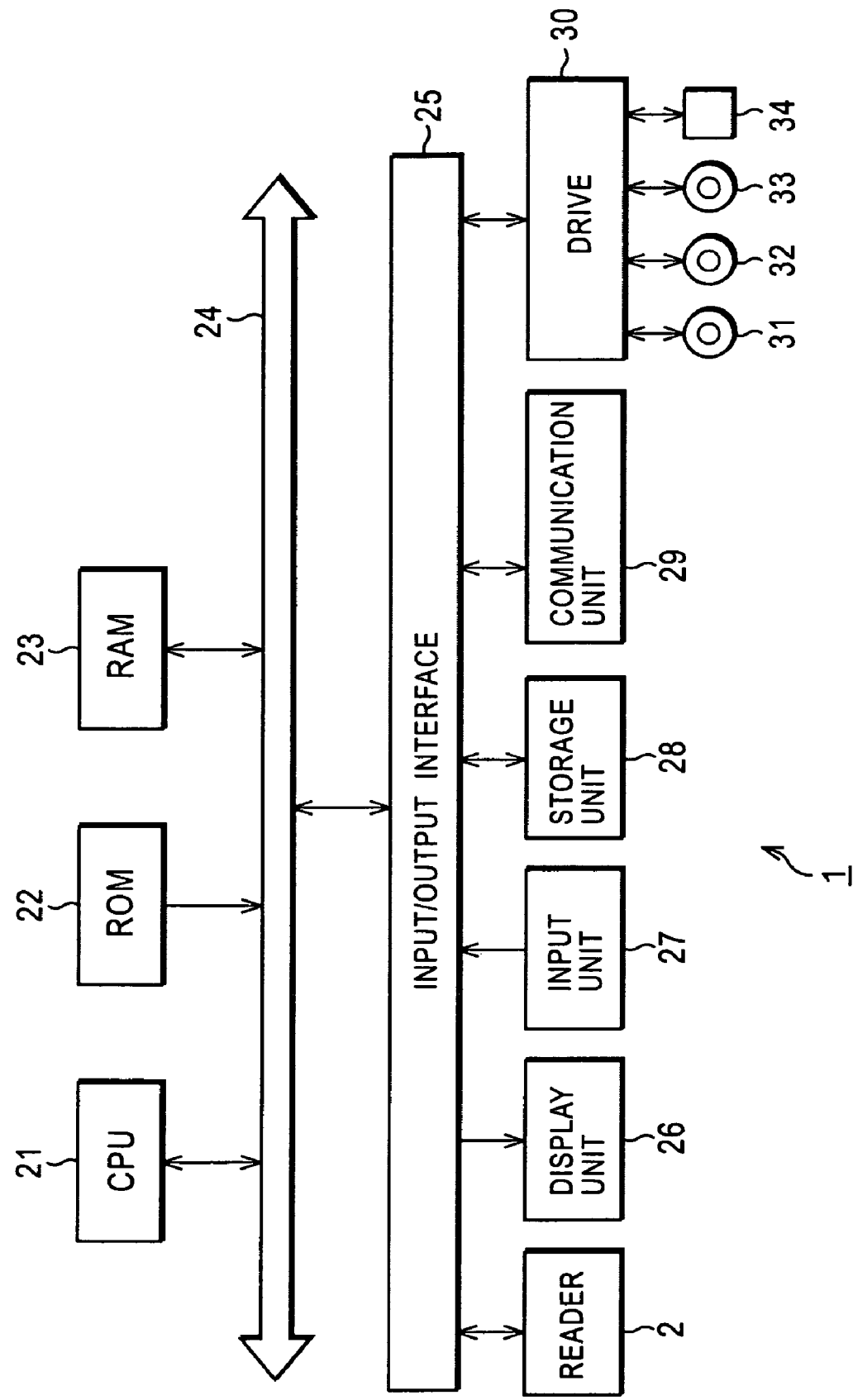
FIG. 2 is a block diagram showing an example of the personal computer in FIG. 1.

FIG. 2 is a block diagram showing an example of the personal computer 1 in FIG. 1.

A CPU (Central Processing Unit) 21 executes various processes in accordance with programs stored in a ROM (Read Only Memory) 22 or a storage unit 28. A RAM 23 stores a program executed by the CPU 21 and data, if necessary. The CPU 21, the ROM 22, and RAM 23 are connected to one another by a bus 24.

An input/output interface 25 is connected to the bus 24, and the reader 2 for reading information from the IC tag 12 built into the PDA 11, as described above, and for example, a display unit 26 including an LCD (Liquid Crystal Display), an input unit 27 including a keyboard and a mouse which are used by a user, and the storage unit 28, which includes a hard disk, are connected to the input/output interface 25.

Also, a communication unit 29 that communicates with various devices, for example, by means of wireless communication such as Bluetooth and wireless LAN (Local Area Network) or by wired communication is connected to the input/output interface 25.

A drive 30 is also connected to the input/output interface 25. In the drive 30, a magnetic disk 31, an optical disk 32, a magneto-optical disk 33, a semiconductor memory 34, etc., can be loaded, if required. A program, read from the magnetic disk 31 to the semiconductor memory 34, is supplied through the input/output interface 25 and is stored in, for example, the storage unit 28.

Figure 3:
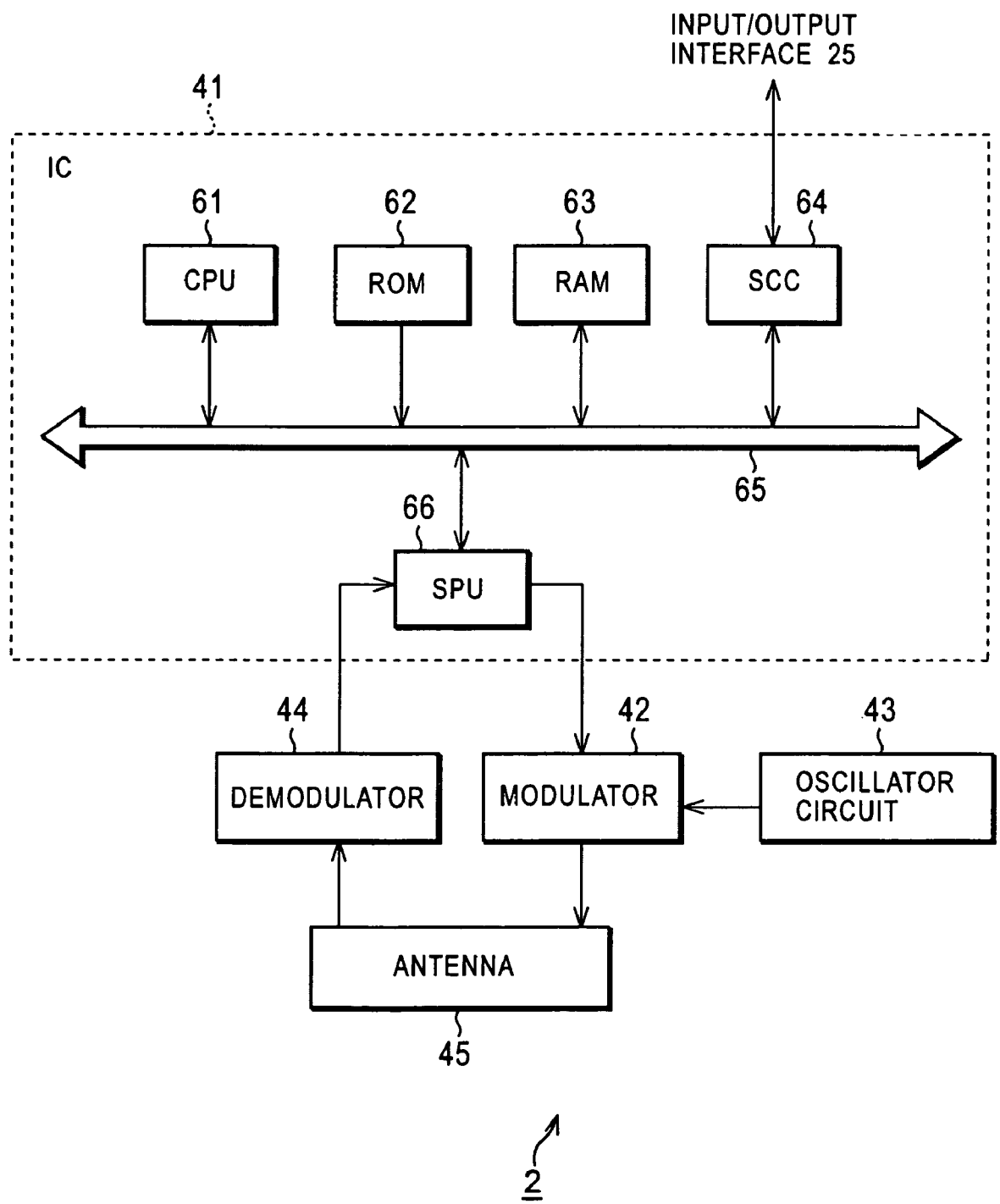
FIG. 3 is a block diagram showing an example of the reader in FIG. 2.

FIG. 3 is a block diagram showing a detailed example of the reader in FIG. 2.

An IC 41 includes a CPU 61, a ROM 62, a RAM 63, an SCC (Serial Communication Controller) 64, an SPU (Signal Processing Unit) 66, and a bus 65 connecting the CPU 61 to the SPU 66 to one another.

The CPU 61 loads a control program stored in the ROM 62 into the RAM 63, and executes various processes based on control signals supplied from the CPU 21 in FIG. 2. For example, when a device ID is transmitted from the IC tag 12 of the PDA 11, the CPU 61 supplies it to the CPU 21.

The SCC 64 uses the bus 65 to supply the CPU 61 with data supplied from the CPU 21 in FIG. 2, and outputs, to the CPU 21, data supplied through the bus 65.

When being supplied with predetermined data by the demodulator 44, the SPU 66 performs BPSK (Binary Phase Shift Keying) demodulation (decoding to Manchester codes) on the data, and supplies the obtained data to the CPU 61. Also, when a command to be transmitted to the PDA 11 is supplied by the bus 65, the SPU 66 performs BPSK modulation (coding to Manchester codes) on the command, and outputs the obtained data to the modulator 42. In other words, the reader 2 can write predetermined information on the IC tag 12 of the PDA 11, if required.

The modulator 42 performs, based on data supplied form the SPU 66, ASK (Amplitude Shift Keying) on a carrier which is supplied from the oscillator circuit 43 and which has a predetermined frequency (e.g., 13.5 MHz), and outputs the generated modulated waves as electromagnetic waves from the antenna 45. The demodulator 44 demodulates modulated waves (ASK modulated waves) acquired by the antenna 45, and outputs the demodulated data to the SPU 66.

The antenna 45 radiates predetermined electromagnetic waves, detects, based on a change in load thereon, for example, the IC tag 12 of the PDA 11, and receives (reads) various types of data.

Figure 4:
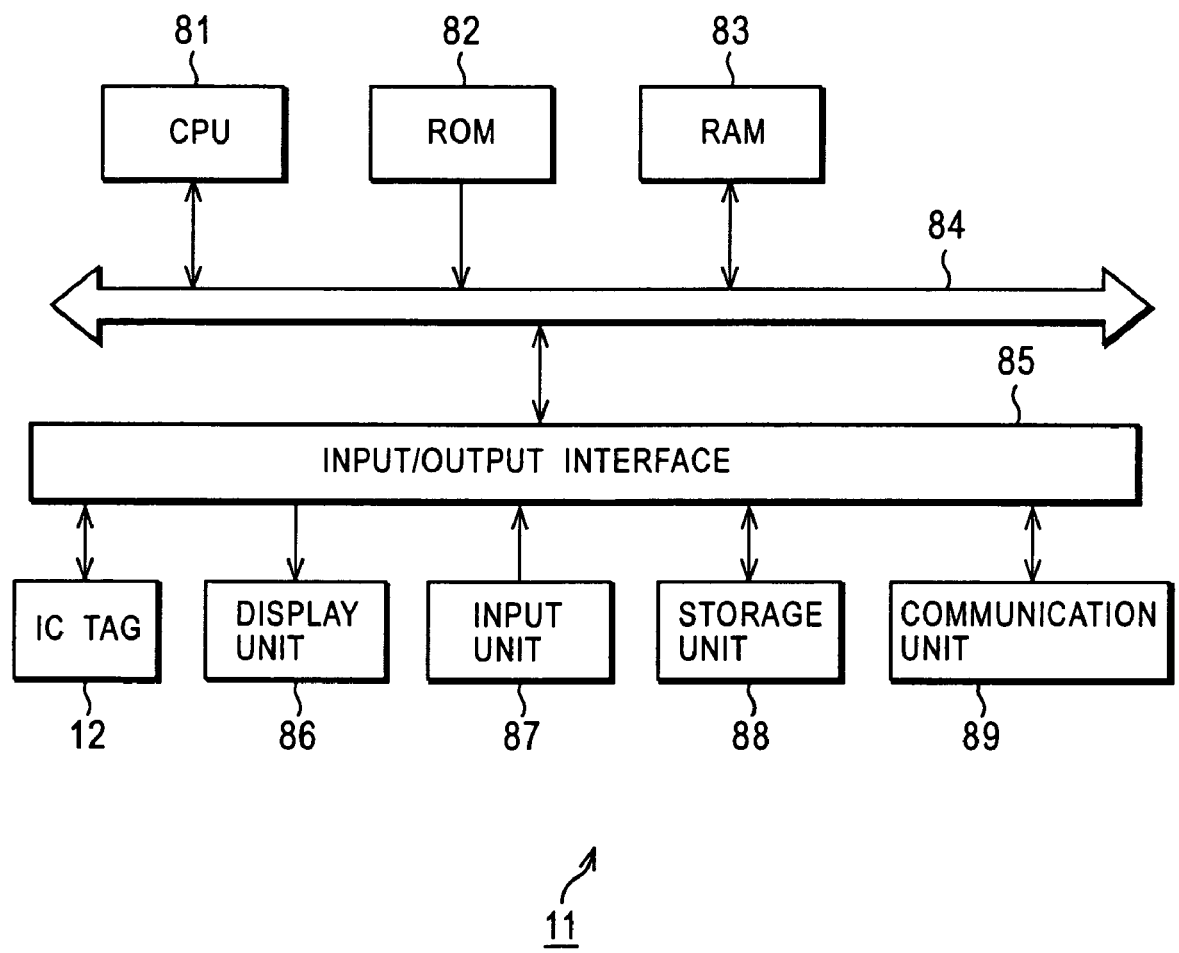
FIG. 4 is a block diagram showing an example of the PDA in FIG. 1.

FIG. 4 is a block diagram showing an example of the PDA 11.

Since a CPU 81 to the communication unit 89 are basically similar to the CPU 21 to the communication unit 29 in the personal computer 1, detailed descriptions thereof are omitted, accordingly.

Based on a control program stored in the ROM 82, etc., the CPU 81 controls the operation of the entirety of the PDA 11, and manages the information stored on the IC tag 12 so that, for example, a device ID can be provided to the personal computer 1.

The CPU 81 stores, for example, in a storage unit 88, an ID identical to the device ID stored in the IC tag 12 so that the device ID of the PDA 11 can be transmitted to the personal computer 1 when the CPU 81 controls the communication unit 89 to access the personal computer 1.

Similarly to the communication unit 29 of the personal computer 1, the communication unit 89 communicates with various devices by wireless, such as Bluetooth or wireless LAN or by wire.

Figure 5:
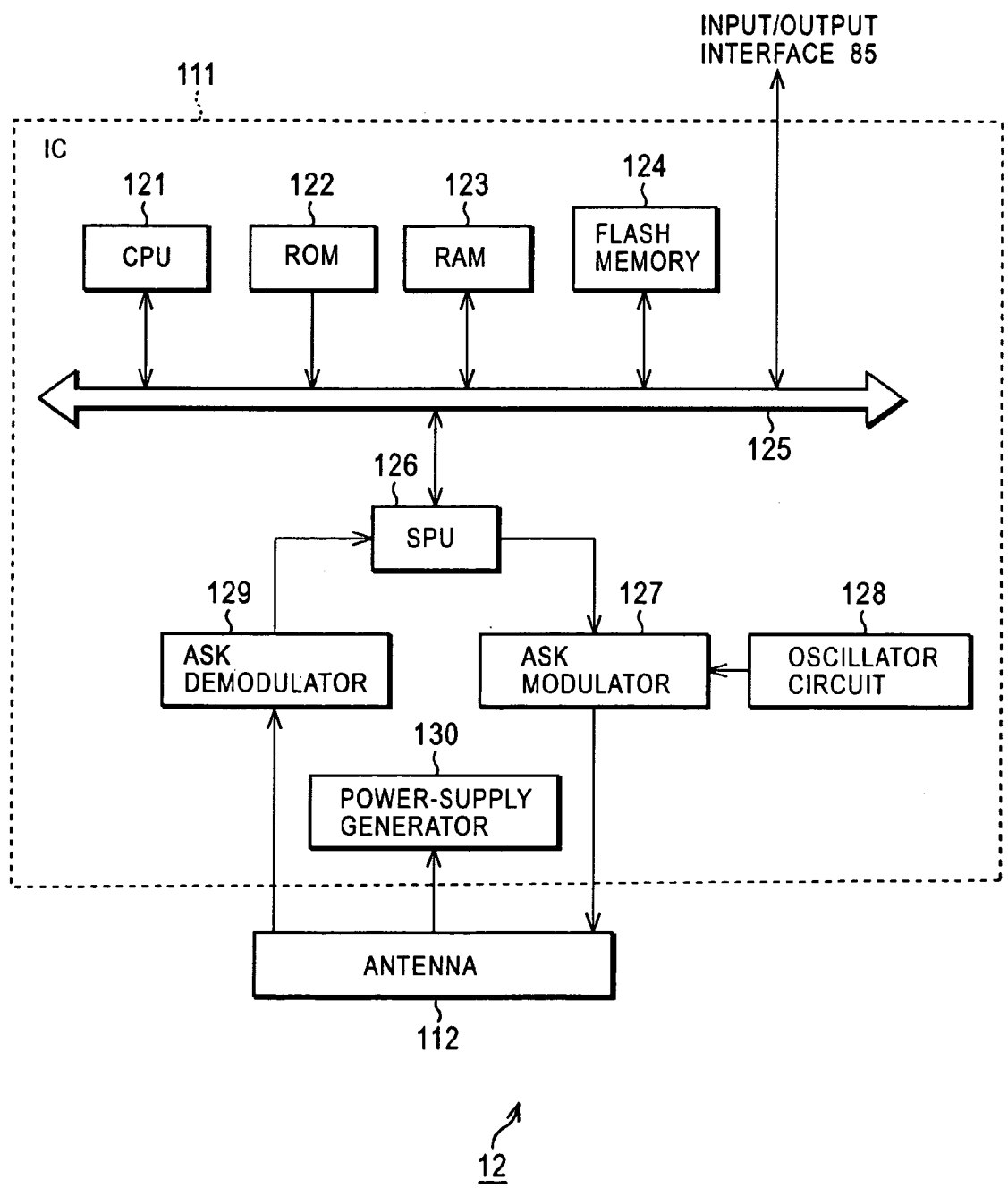
FIG. 5 is a block diagram showing an example of the IC tag in FIG. 4.

FIG. 5 is a block diagram showing an example of the IC tag 12 in FIG. 4.

The IC tag 12 includes, for example, an antenna 112 and an IC 111 in which components other than that are accommodated in a single chip, and uses electromagnetic induction to perform half-duplex communication using various types of data with, for example, the reader 2 of the personal computer 1. Those having a function similar to that of the IC tag 12 include, for example, Felica (registered trademark).

A CPU 121 controls, based on a control program stored in a ROM 122, the operation of the entirety of the IC tag 12.

When data demodulated by an ASK demodulator 129 has a BPSK modulated form, an SPU 126 performs demodulation (Manchester code decoding) on the data based on a clock signal supplied from a PLL unit, which is not shown, and outputs the demodulated data to the CPU 121, etc., through a bus 125, if required.

The SPU 126 performs BPSK modulation (coding to Manchester codes) on data supplied through the bus 125, and outputs the modulated data to an ASK modulator 127.

When transmitting, for example, data such as a device ID to the reader 2 of the personal computer 1, the ASK modulator 127 turns on/off a predetermined switching element in response to data supplied from the SPU 126. Only when the switching element is in on-state does the ASK modulator 127 change the load on the antenna 112 by connecting a predetermined load in parallel to the antenna 112.

The change in the load on the antenna 112 causes the ASK modulator 127 to perform ASK modulation on modulated waves from the reader 2 which are being received by the antenna 112 and to transmit (change a terminal voltage of the antenna 45 of the reader 2) the modulated component to the reader 2 through the antenna 112.

The ASK demodulator 129 uses envelope detection to demodulate modulated waves (ASK modulated waves) received by the antenna 112, and outputs the demodulated data to the SPU 126. The antenna 112 resonates due to, for example, electromagnetic waves having a predetermined frequency which are radiated from the reader 2.

After rectifying an alternating current magnetic field excited by the antenna 112, and stabilizing the obtained current, a power-supply generator 130 supplies the current as a direct-current power supply to each component.

Next, the operation of the communication system in FIG. 1 is described.

Figure 6:
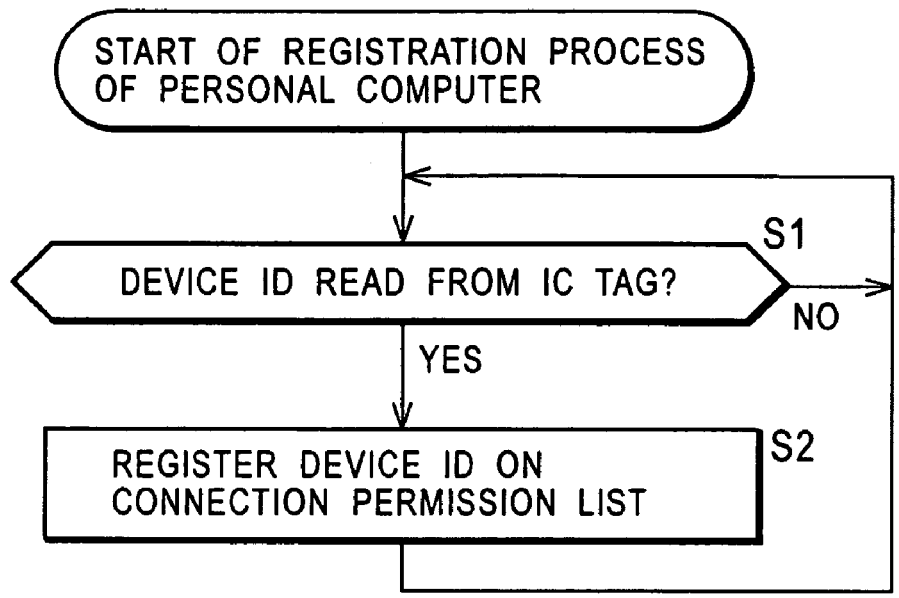
FIG. 6 is a flowchart illustrating a process of the personal computer in FIG. 2.

At first, a process of the personal computer 1 which acquires an device ID from the PDA 11 and registers the device ID is described with reference to the flowchart in FIG. 6.

In step S1, based on an output from the reader 2, the CPU 21 determines whether or not it has read an device ID from the IC tag 12 of the PDA 11, and is on standby until it determines that it has read.

For example, the reader 2 always radiates electromagnetic waves for detecting the IC tag 12, and reads the device ID of the PDA 11 which is stored on the IC tag 12 (PDA 11) when the IC tag 12 is brought close to the reader 2.

When the CPU 21 determines in step S1 that it has read the device ID, it proceeds to step S2, and registers the device ID of the PDA 11 on a connection permission list.

The connection permission list is a list of device IDs read by the reader 2 and is stored in the storage unit 28. Only devices having the device IDs registered on the list can connect to (access) the communication unit 29.

After that, the process returns to step S1, and the subsequent processing is repeatedly executed.

Figure 7:
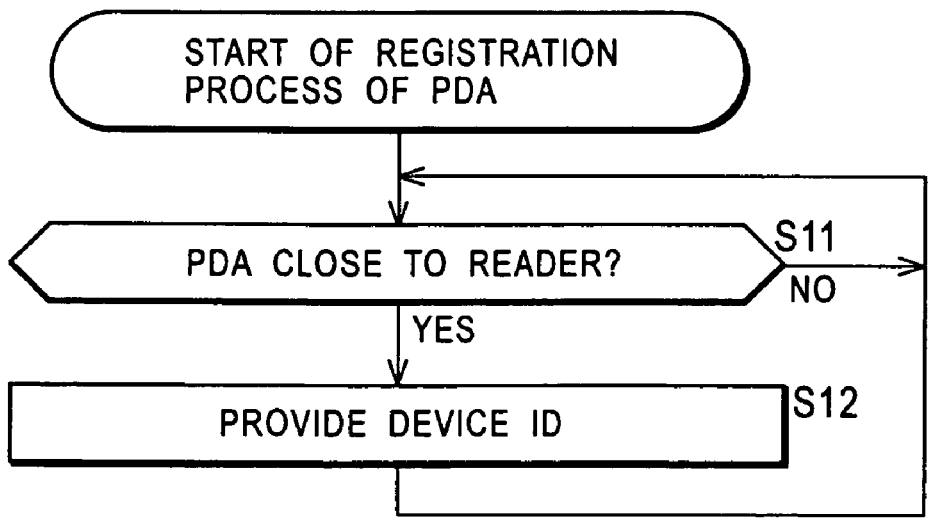
FIG. 7 is a flowchart illustrating a process of the PDA in FIG. 4.

Next, a process of the PDA 11 which registers a device ID in the personal computer 1 is described with reference to the flowchart in FIG. 7.

In step S11, the CPU 121 of the IC tag 12 determines whether or not the IC tag 12 is positioned nearby to the reader 2, and is on standby until the CPU 121 determines that the IC tag 12 is positioned nearby.

As described above, since the electromagnetic waves for detecting the IC tag 12 are radiated from the reader 2, when the waves are received by the antenna 112, the CPU 121 determines in step S1 that the IC tag 12 is positioned close to the reader 2. Proceeding to step S12, the CPU 112 provides the device ID stored in the flash memory 124.

The provided device ID is received by the reader 2 of the personal computer 1, and is registered on the connection permission list.

After that, the process returns to step S11, and repeatedly executes the subsequent processing.

Next, a process of the PDA 11 which connects to the personal computer 1 (the communication unit 29) is described with reference to the flowchart in FIG. 8.

In step S21, based on an output from the input unit 87, the CPU 81 determines whether or not the PDA 11 is instructed to connect to the personal computer 1 by the user, and is on standby until it determines that the PDA 11 is instructed.

When determining in step S21 that the PDA 11 is instructed to connect to the personal computer 1, the CPU 81 proceeds to step S22, and controls the communication unit 89 to access the personal computer 1 and to transmit the device ID of the PDA 11.

When the storage unit 88 stores, for example, an address for communicating with the personal computer 1, communication-method identifying information (communication information), etc., the CPU 81 accesses the personal computer 1 based thereon, and transmits the device ID from the communication unit 89. Obviously, information for accessing the personal computer 1 may also be input by the user.

The device ID transmitted from the communication unit 89 by wireless or by wire is received by the communication unit 29 of the personal computer 1. It is determined whether or not the device ID is registered on the connection permission list.

In step S23, based on the information received by the communication unit 89, the CPU 81 determines whether or not the personal computer 1 has notified the PDA 11 of permission of the link.

When determining in step S23 that the personal computer 1 has not notified the personal computer 1 of permission of the connection (the connection is rejected), the CPU 81 returns to step S21 and repeatedly executes the subsequent processing.

When conversely determining in step S23 that the personal computer 1 has notified the PDA 11 of permission of the connection, the CPU 81 proceeds to step S24, and controls the communication unit 89 to establish communication with the personal computer 1 and to transmit and receive predetermined information. After that, the process returns to step S21, and the subsequent processing is repeatedly executed.

Figure 8:
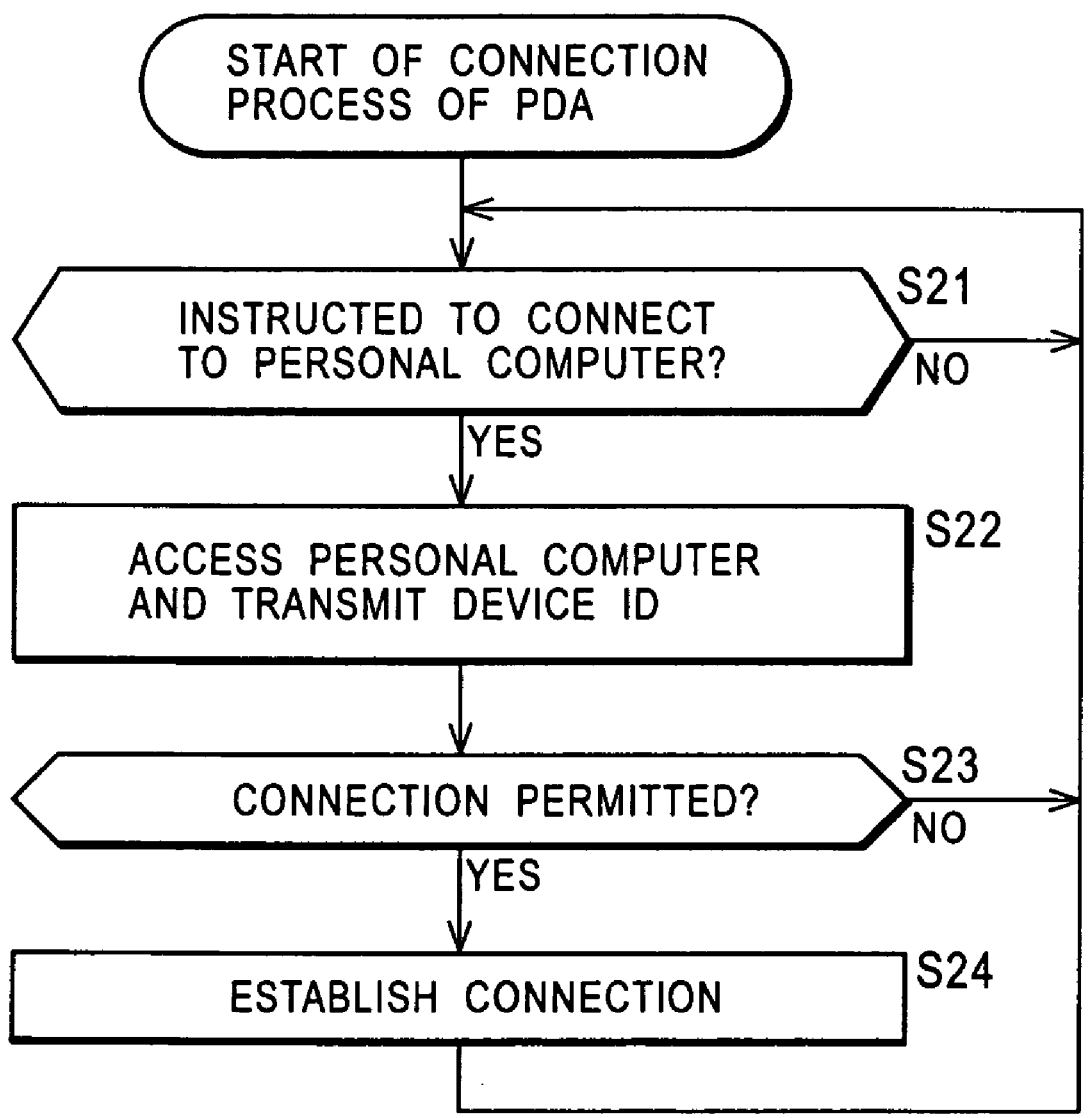
FIG. 8 is a flowchart illustrating another process of the PDA in FIG. 4.
Figure 9:
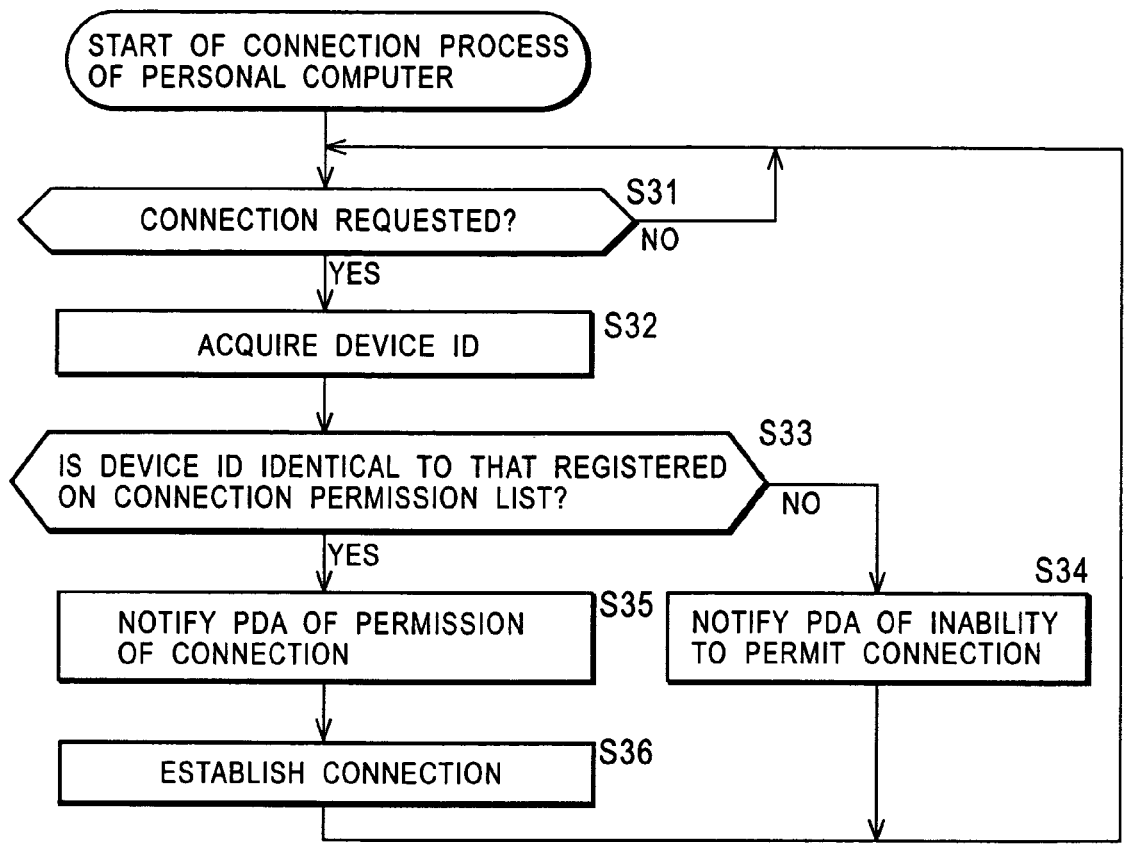
FIG. 9 is a flowchart illustrating another process of the personal computer in FIG. 2.

Next, a process of the personal computer 1 which is executed correspondingly to the process in FIG. 8 is described with reference to the flowchart in FIG. 9.

In step S31, based on an output from the communication unit 29, the CPU 21 determines whether or not a connection to the personal computer 1 is requested by the PDA 11, and is on standby until the CPU 21 determines that a connection to the personal computer 1 is requested.

When determining in step S31 that the connection to the personal computer 1 is requested, the CPU 21 proceeds to step S32, and acquires the device ID received by the communication unit 29. As is described with reference to the flowchart in FIG. 8, when a connection to the personal computer 1 is requested, the device ID of the PDA 11 is transmitted from the PDA 11.

In step S33, by referring to the connection permission list stored in the storage unit 28, the CPU 21 determines whether or not the transmitted device ID is registered on the connection permission list, that is, whether to permit the connection.

When determining in step S33 that the transmitted device ID is not registered on the connection permission list, the CPU 21 proceeds to step S34, and notifies the device having transmitted the device ID that the personal computer 1 cannot permit the connection.

When conversely determining in step S33 that the transmitted device ID is not registered on the connection permission list, the CPU 21 proceeds to step S35, and controls the communication unit 29 to notify the PDA 11 that the personal computer 1 permits the connection. For example, the device ID of the PDA 11 is registered as described above, the PDA 11 is notified that the connection is permitted.

In step S36, communication is established, for example, with the PDA 11, to which a connection is permitted, and predetermined information is transmitted and received.

Since the IC tag 12 is used to provide the device ID, as described above, the user (user who wishes a connection to the personal computer 1) of the PDA 11 can register the device ID by simply bringing the PDA 11 close to the personal computer 1.

Also, only devices having device IDs registered on the connection permission list are permitted to connect. Thus, users who do not bring their devices close to the personal computer 1 can be prevented from accessing the personal computer 1.

Figure 10:
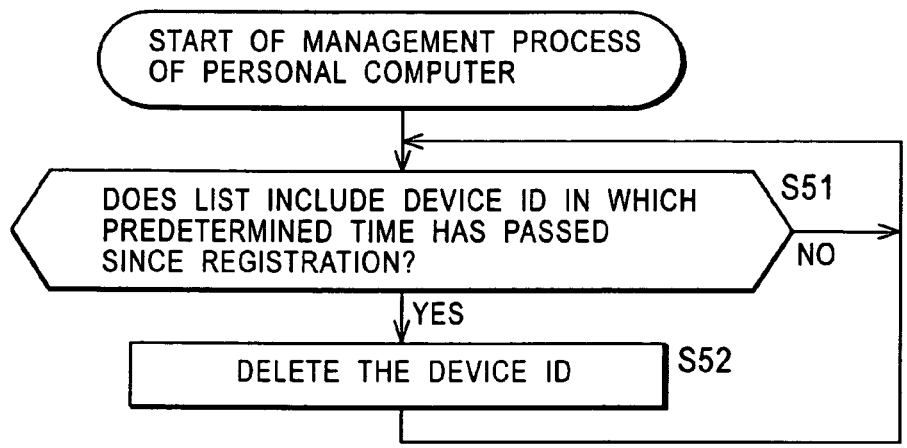
FIG. 10 is a flowchart illustrating still another process of the personal computer in FIG. 2.

Next, a process of the personal computer 1 which manages the device IDs registered on the connection permission list is described with reference to the flowchart in FIG. 10.

In step S51, the CPU 21 refers to the connection permission list and determines whether or not the connection permission list includes a device ID in which a predetermined time has passed since its registration.

When determining in step S51 that the connection permission list does not include any device ID in which the predetermined time has passed, the CPU 21 repeatedly executes the subsequent processing. Conversely, when determining that the connection permission list includes a device ID in which the predetermined time has passed, the CPU 21 proceeds to step S52 and deletes the device ID.

Accordingly, even a user who brought his or her device close to the personal computer 1 and registered its device ID in the past cannot establish a connection to the personal computer 1 after a certain time passes since the device ID is registered. Therefore, regarding permission of a connection, also temporal restriction can be set.

In the foregoing, the personal computer 1 is provided with the reader 2, and the PDA 11 is provided with the IC tag 12. Conversely, also by providing the personal computer 1 with an IC tag (IC tag 141 (see FIG. 11), and providing the PDA 11 with a reader (reader 151 (see FIG. 12), connections from various devices can be restricted.

For example, in this case, an IC tag 141 of the personal computer 1 stores information (communication information) such as the address of the personal computer 1 and a URL (Uniform Resource Locator), and a password. When being positioned close to the personal computer 1, a reader 151 of the PDA 11 reads the information from the IC tag 141.

When being instructed to connect to the personal computer 1, the PDA 11 uses the address read by the reader 151 to access the personal computer 1 and transmits the password.

The personal computer 1 determines whether or not the transmitted password is identical to a password provided by the IC tag 141. When determining that both are identical, the personal computer 1 permits the PDA 11 to connect.

Accordingly, similarly to the above-described case, only a user who brings his or her device (a device in which the reader 151 is provided) can access the personal computer 1.

Figure 11:
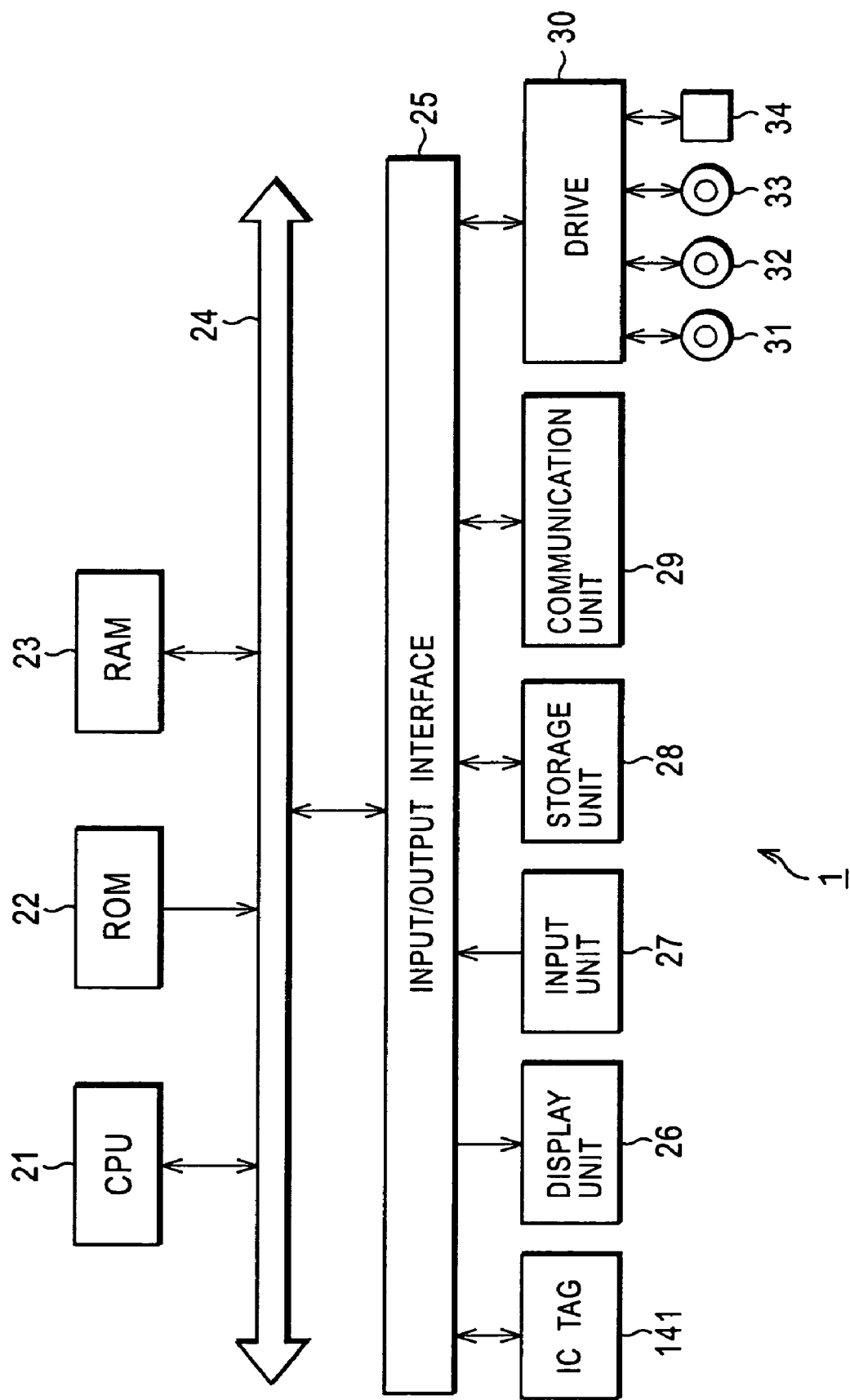
FIG. 11 is a block diagram showing another example of the personal computer in FIG. 1.

FIG. 11 is a block diagram showing another example of the personal computer 1 in which the IC tag 141 is provided.

Since the CPU 21 to semiconductor memory 34 shown in FIG. 11 are identical to those shown in FIG. 2, detailed description thereof are omitted, if required.

In order that information, such as an address, and a password, may be provided to the PDA 11 in a close position, the CPU 21 stores the information in the IC tag 141. Also, the CPU 21 uses, for example, the storage unit 28 to store a password identical to the password stored on the IC tag 141 so that the CPU 21 can determine whether or not the password posted from the communication unit 29 through the PDA 11 is valid.

When the reader 151 of the PDA 11 is positioned nearby and the radiated electromagnetic waves are received, the IC tag 141 provides the reader 151 with the information, such as the address of the personal computer 1, and the password. The IC tag 141 is similar in structure to the IC tag 12 shown in FIG. 5, and the information, such as the address of the personal computer 1, and the password, are stored in a flash memory.

Figure 12:
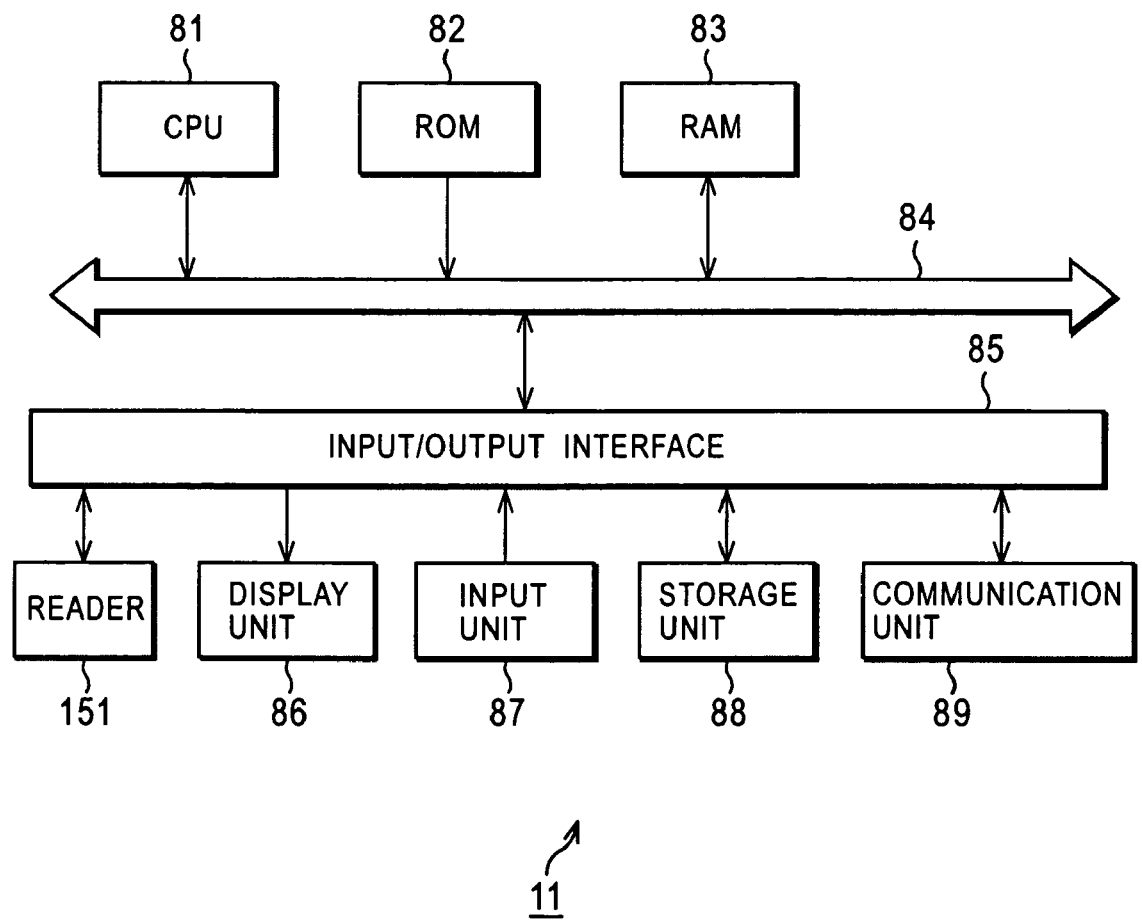
FIG. 12 is a block diagram showing another example of the PDA in FIG. 1.

FIG. 12 is a block diagram showing an example of the PDA 11, in which the reader 151 is provided.

Since the CPU 81 to communication unit 89 shown in FIG. 12 are identical to those shown in FIG. 4, detailed descriptions thereof are omitted, accordingly.

When being positioned close to the personal computer 1 and detecting the IC tag 141, the reader 151 reads and supplies, to the CPU 81, the information, such as the address, and the password which are stored on the IC tag 141.

Next, a process of the PDA 11 which establishes, based on the information read from the IC tag 141, a connection to the personal computer 1 is described with reference to the flowchart in FIG. 13.

In step S61, based on an output from the reader 151, the CPU 81 determines whether or not data has been read from the IC tag 141, and is on standby until the CPU 81 determines that the data has been read.

When the PDA 11 is brought close to the personal computer 1, the data stored on the IC tag 141 is read and supplied to the CPU 81 by the reader 151.

When determining in step S61 that the data has been read from the IC tag 141, the CPU 81 proceeds to step S62, and extracts the address and password of the personal computer 1 from the read data.

The extracted address and password are stored, for example, in the RAM 82 or the storage unit 88 in step S63.

In step S64, the CPU 81 determines whether or not the PDA 11 is instructed by the user to connect to the personal computer 1, and is on standby until the CPU 81 determines that the PDA 11 is instructed.

When determining in step S64 that the PDA 11 is instructed to connect to the personal computer 1, the CPU 81 proceeds to step S65, and accesses the personal computer 1 by controlling the communication unit 89 based on the information such as the address which is read by the reader 151 and is stored.

In step S66, the CPU 81 determines whether or not the PDA 11 is requested to transmit a password by the personal computer 1, and is on standby until the CPU 81 determines that the PDA 11 is requested.

When determining in step S66 that the PDA 11 is requested to transmit the password, the CPU 81 proceeds to step S67, and transmits the stored password from the communication unit 89 to the personal computer 1.

In step S68, the CPU 81 determines whether or not the PDA 11 is permitted to connect. If the CPU 81 has determined that the PDA 11 is not permitted to connect, it returns to step S61 and repeatedly executes the subsequent processing.

As described later, the personal computer 1 determines whether or not a password transmitted from the PDA 11 is identical to a password managed by the personal computer 1. Only when it is determined that both are identical does the personal computer 1 permit the PDA 11 to connect.

In step S68, alternatively, if the CPU 81 has determined that the PDA 11 is permitted to connect, it proceeds to step S69, and establishes a connection and uses the communication unit 89 to transmit and receive various types of information.

Figure 13:
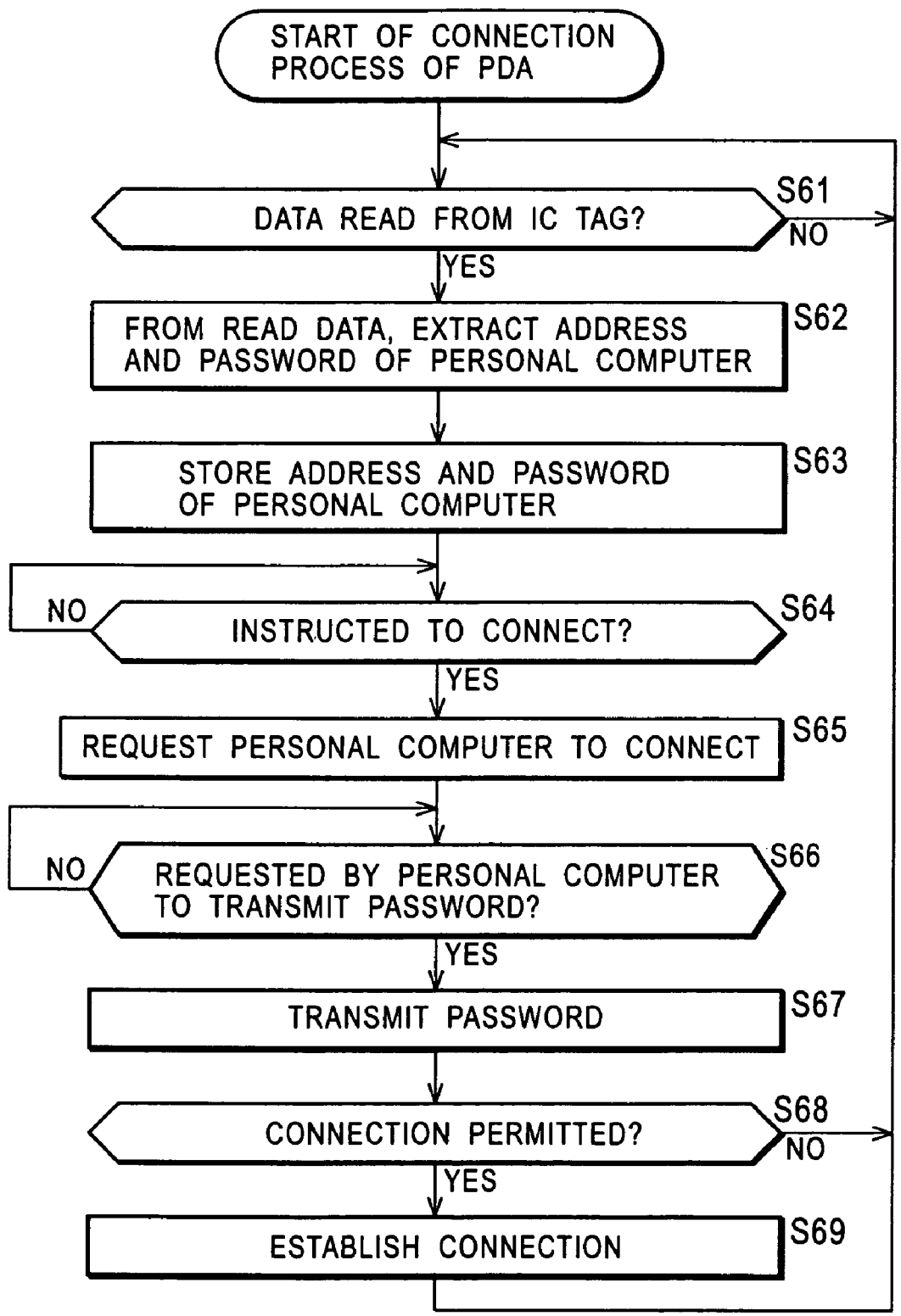
FIG. 13 is a flowchart illustrating a process of the PDA in FIG. 12.
Figure 14:
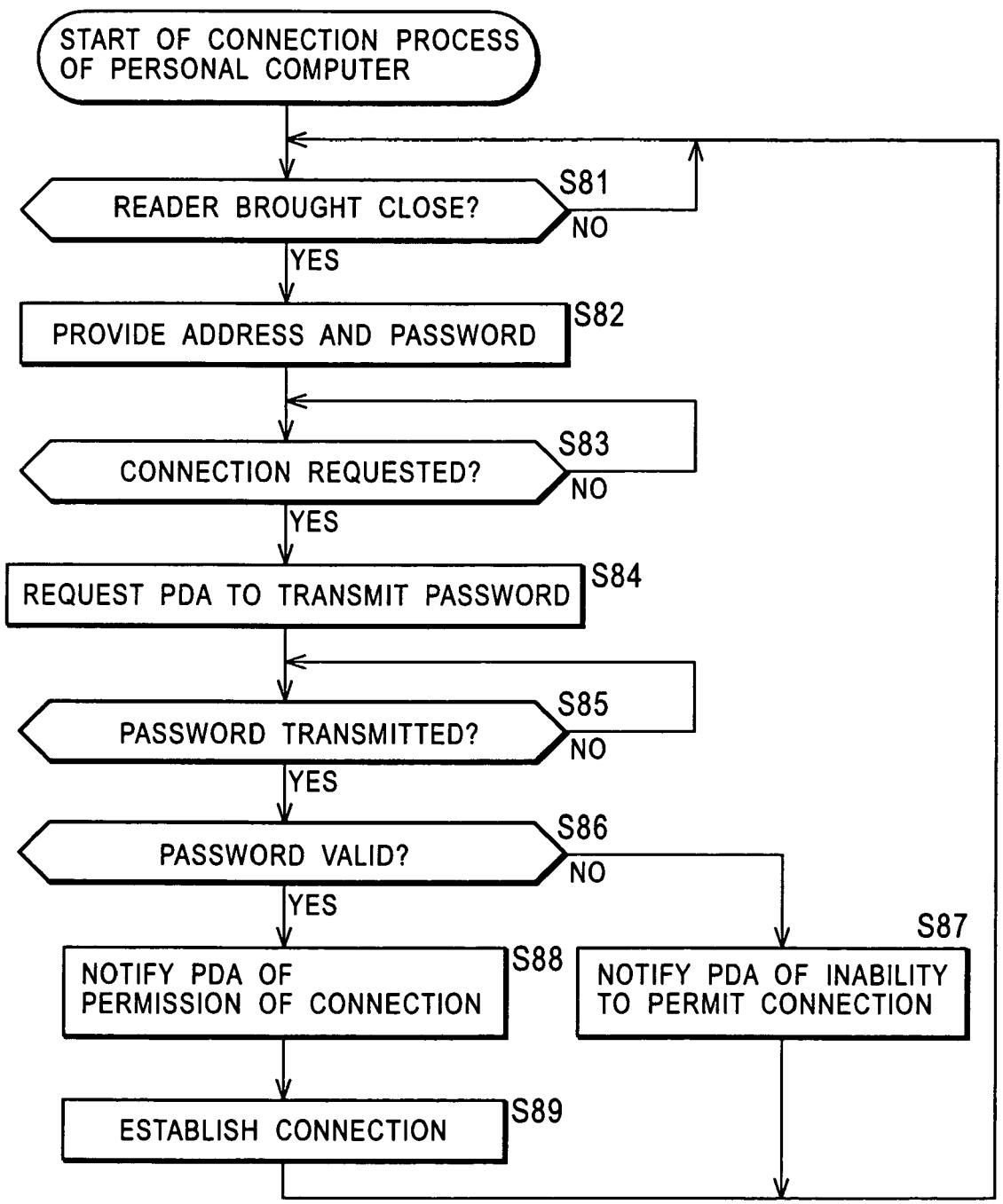
FIG. 14 is a flowchart illustrating a process of the personal computer in FIG. 11.

Next, a process of the personal computer 1 which is executed correspondingly to the process in FIG. 13 is described with reference to the flowchart in FIG. 14.

In step S81, a CPU of the IC tag 141 determines whether or not the reader 151 of the PDA 11 is positioned nearby, and is on standby until the CPU determines that the reader 151 is positioned nearby.

When determining in step S81 that the reader 151 of the PDA 11 is positioned nearby, the CPU of the IC tag 141 proceeds to step S82, and provides the PDA 11 (the reader 151) with the information, such as the address, and the password which are stored in the flash memory.

In step S83, based on an output from the communication unit 29, the CPU 21 determines whether or not a connection to the personal computer 1 is requested to the PDA 11 thereby, and is on standby until the CPU 21 determines that the connection to the personal computer 1 is requested.

When determining in step S83 that the connection to the personal computer 1 is requested by the PDA 11, the CPU 21 proceeds to step S84, and requests the PDA 11 to transmit a password.

In step S85, the CPU 21 determines whether or not the password has been transmitted, and is on standby until the CPU 21 determines that the password has been transmitted. As described with reference to the flowchart in FIG. 13, in response to this request, the password provided by the IC tag 141 is transmitted from the PDA 11.

When determining in step S85 that the password has been transmitted, the CPU 21 proceeds to step S86, and determines whether or not the transmitted password is identical to the password (a password identical to that provided from the IC tag 141) stored in the storage unit 28 or the like, that is, whether or not the password is valid. When determining in step S85 that the password is not valid, the CPU 21 proceeds to step S87 and notifies the PDA 11 that the personal computer 1 cannot permit the PDA 11 to connect. After that, the process returns to step S81, and repeatedly execute the subsequent processing.

In step S86, alternatively, if the CPU 21 has determined that the password is valid, it proceeds to step S88, and notifies the PDA 11 that the personal computer 1 permits the PDA 11 to connect.

After that, in step S89, the connection is established and the communication unit 29 is used to transmit and receive various types of information.

As described above, for example, also by providing the personal computer 1 with the IC tag 141, and providing the PDA 11 with the reader 151, links from those other than users who bring their devices close to the personal computer 1 can be restricted.

In addition, it can be determined, based on a password, whether or not a user who brings a device close to the personal computer 1 requests a connection to the personal computer 1. Thus, even if a user who does not bring a device close to the personal computer 1 acquires an address or the like, only it does not enable the user to establish a connection to the personal computer 1.

Figure 15:
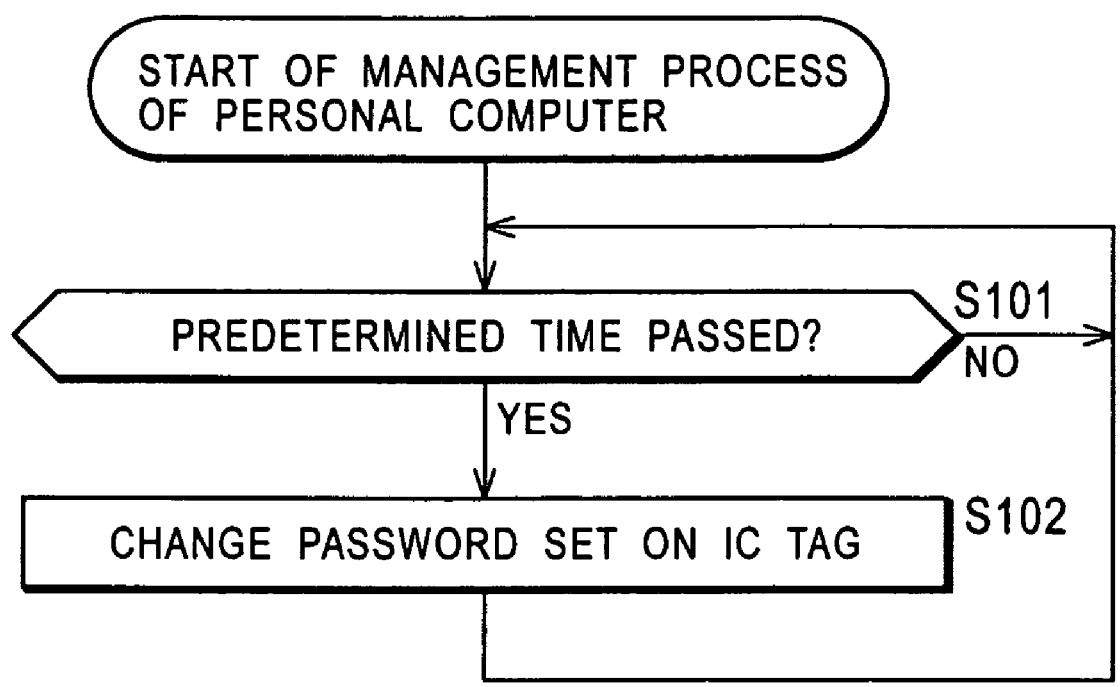
FIG. 15 is a flowchart illustrating another process of the personal computer in FIG. 11.

Next, a process of the personal computer 1 which manages the password stored on the IC tag 141 is described with reference to the flowchart in FIG. 15.

In step S101, the CPU 21 determines whether or not a predetermined time has passed, and is on standby until the CPU 21 determines that the time has passed. When determining in step S102 that the predetermined time has passed, the CPU 21 proceeds to step S102, and changes the password stored in the flash memory of the IC tag 141.

After that, the process returns to step S101, and repeatedly executes the subsequent processing.

Accordingly, similarly to the process described with reference to FIG. 10, for a user who has acquired a password or the like by bringing his or her own device close to the personal computer 1, it is impossible to establish a connection to the personal computer 1 after a certain time has passed since registration.

In the above example, for the personal computer 1 and the PDA 11, either a reader or an IC tag is provided. By providing both, it is more ensured that connections from various devices are restricted.

Figure 16:
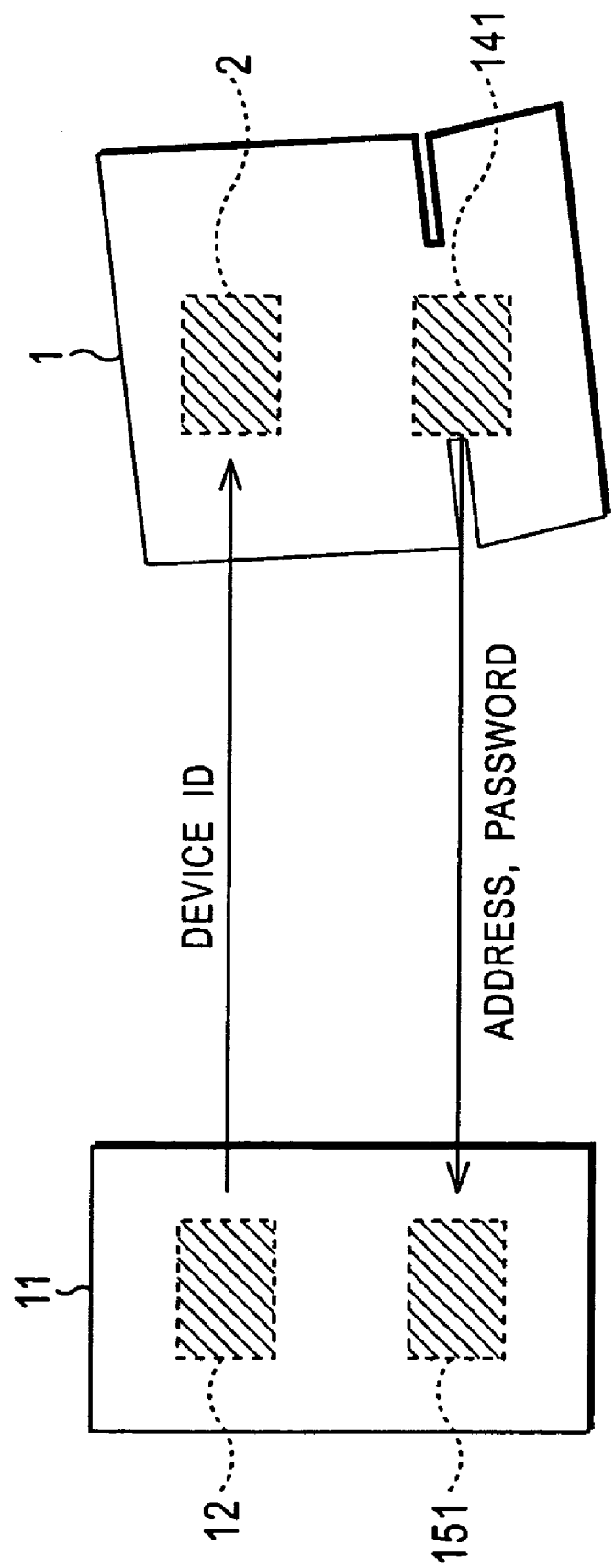
FIG. 16 is an illustration of examples of information transmitted and received between the personal computer and the PDA.

FIG. 16 is a schematic illustration of the personal computer 1 and PDA 11 shown in FIG. 1, and shows examples of information transmitted and received as electromagnetic waves when both devices are provided with IC tags and readers.

When the personal computer 1 and the PDA 11 are positioned close to each other, as shown in FIG. 16, the device ID of the PDA 11 is transmitted (read by the reader 2) from the IC tag 12 of the PDA 11 to the reader 2 of the personal computer 1.

Also, from the IC tag 141 of the personal computer 1, information such as an address which is necessary for a connection, and a password are transmitted (read by the reader 151) to the reader 151 of the PDA 11.

Based on the pieces of information, the connection to the personal computer 1 is restricted.

Specifically, the device ID acquired by the personal computer 1 is registered on a connection permission list as described above, and when a connection to the PDA 11 is actually requested, it is determined whether or not the device ID transmitted from the PDA 11 is registered on the connection permission list. The address acquired by the PDA 11 is used for the PDA 11 to access the personal computer 1. The password is transmitted to the personal computer 1, and it is determined whether or not the password is identical to the password managed by the personal computer 1.

Only a device which has a device ID registered on the connection permission list and which has transmitted a password identical to a password provided by the personal computer 1 is permitted to connect to the personal computer 1.

Figure 17:
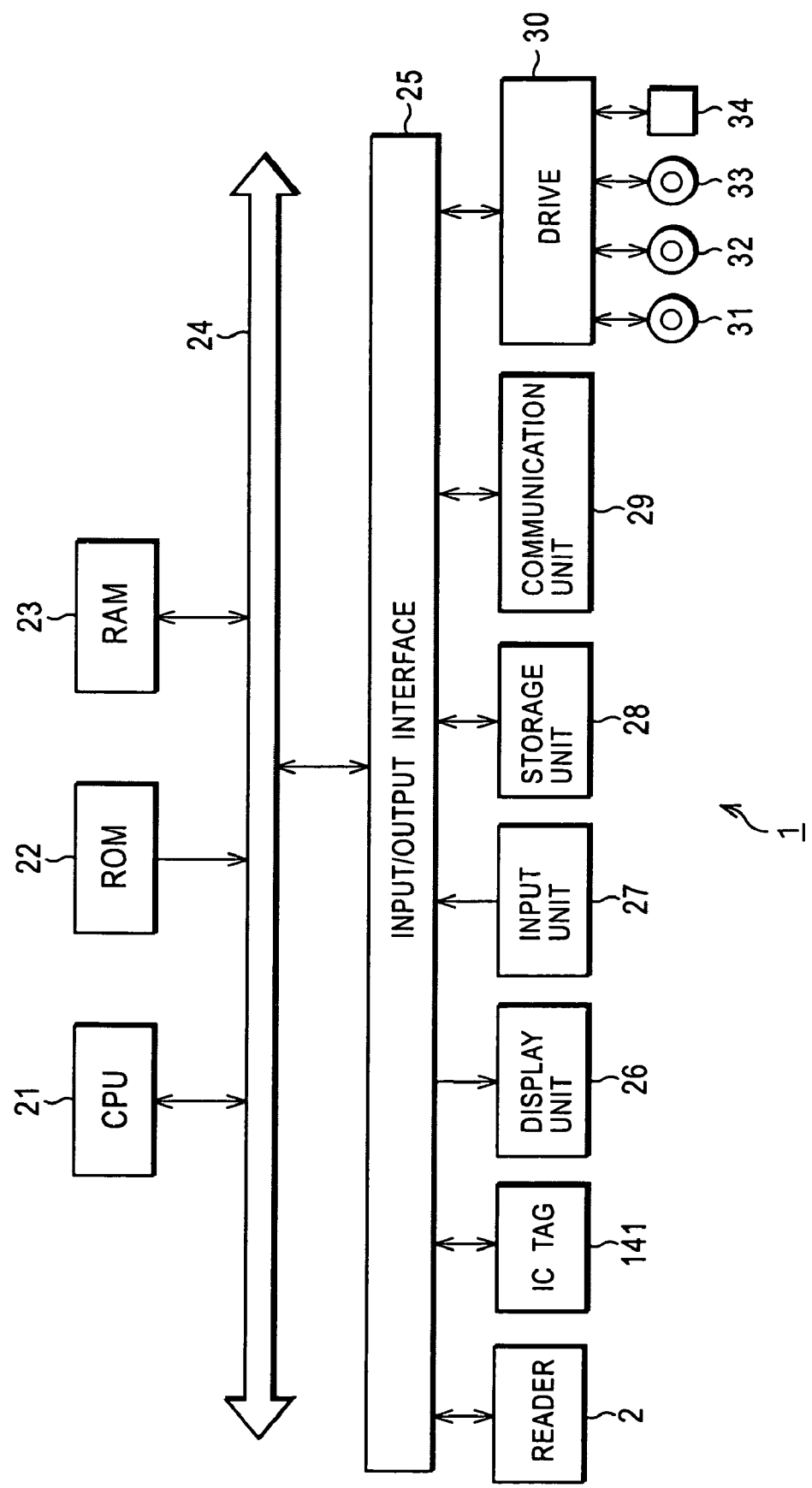
FIG. 17 is a block diagram showing still another example of the personal computer in FIG. 1.

FIG. 17 is a block diagram showing an example of the personal computer 1, in which the reader 2 and the IC tag 141 are provided.

The structure shown in FIG. 17 is a combination of the structures shown in FIG. 2 and FIG. 17.

In other words, the device ID of the PDA 11 which is read by the reader 2 is transferred to, for example, the storage unit 28, and is registered on the connection permission list.

The IC tag 141 stores information (communication information) such as an address which is necessary for another device to connect to the personal computer 1. The information is read by the reader 151 of the PDA 11.

The storage unit 28, or the like, stores a password identical to a password stored on the IC tag 141, and the password is used to determine identity with the password received by the communication unit 29.

Figure 18:
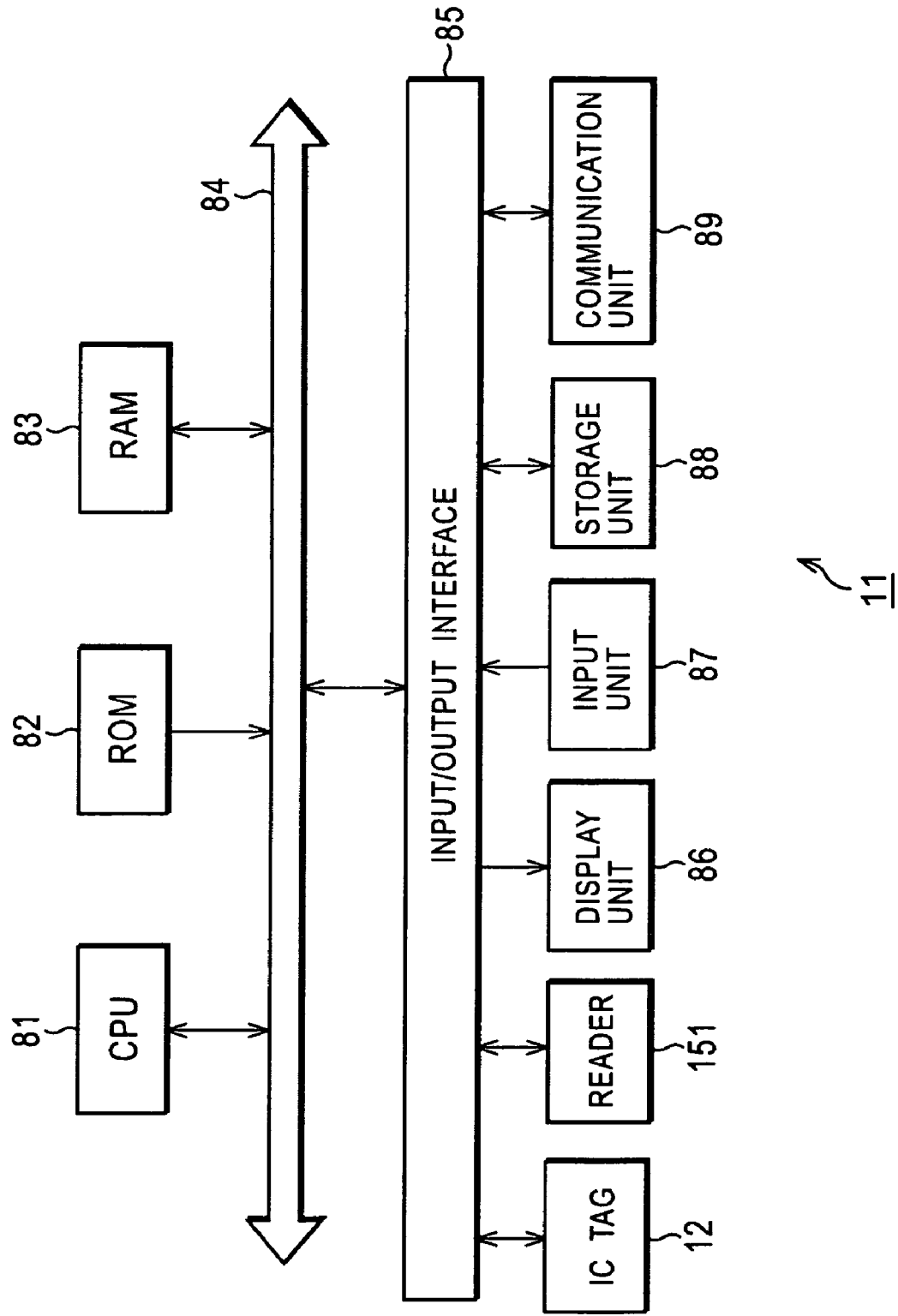
FIG. 18 is a block diagram showing still another example of the PDA in FIG. 1.

FIG. 18 is a block diagram showing an example of the PDA 11, in which the IC tag 12 and the reader 151 are provided.

The structure shown in FIG. 18 is a combination of the structures shown in FIG. 4 and FIG. 12.

In other words, the device ID of the PDA 11 is stored on the IC tag 12 and is read by the reader 2 of the PDA 11. Also, an ID that is identical to the device ID stored on the IC tag 12 is provided also in the storage unit 88 or the like, and is transmitted from the communication unit 89 to the personal computer 1.

The reader 151 reads and supplies, to the CPU 81, the address and the password from the IC tag 141 of the personal computer 1. The password is transmitted from the communication unit 89 to the personal computer 1 and is used for authentication.

Next, a process of the PDA 11 which connects to the personal computer 1 is described with reference to the flowchart in FIG. 19.

This process is a combination of the processes described with reference to FIG. 7, FIG. 8, and FIG. 13.

In other words, processing from step S111 to step S113 is similar to that from step S61 to step S63 in FIG. 13.

In step S111, based on an output from the reader 151, the CPU 81 determines whether or not the reader 151 has read data from the IC tag 141 of the personal computer 1. If the CPU 81 has determined that the reader 151 has read data, it proceeds to step S112. In step S112, the CPU 81 extracts the address and password of the personal computer 1 from the data read from the reader 151.

The extracted address and password are stored, for example, in the RAM 82 or the storage unit 88 in step S113.

In step S114, similarly to step S12 in FIG. 12, the CPU 81 provides the reader 2 of the personal computer 1 with the device ID stored on the IC tag 12. In other words, the reader 2 reads the device ID.

In step S115, the CPU 81 determines whether or not the PDA 11 is instructed to connect to the personal computer 1, and is on standby until the CPU 81 determines that the PDA 11 is instructed.

When determining in step S115 that the PDA 11 is instructed to connect to the personal computer 1, the CPU 81 proceeds to step S116, and accesses the personal computer 1 based on the stored information such as the address, and transmits the device ID from the communication unit 89.

The personal computer 1 determines whether or not the transmitted device ID is registered on the connection permission list. The PDA 11 is notified of the result.

In step S117, the CPU 81 determines whether or not the personal computer 1 has notified the PDA 11 that the transmitted device ID is registered on the connection permission list. If the CPU 81 has determined that the personal computer 1 has not notified the PDA 11 (determination of no registration has been posted), the CPU 81 proceeds to step S111 and repeatedly executes the subsequent processing.

In step S117, alternatively, if the CPU 81 has determined that personal computer 1 has notified the PDA 11 of the determination that the device ID is registered on the connection permission list, the CPU 81 proceeds to step S181.

Processing from step S118 to step S121 is similar to that from step S66 to step S69 in FIG. 13.

In step S118, the CPU 81 determines whether or not the PDA 11 is requested by the personal computer 1 to transmit the password, and is on standby until the CPU 81 determines that the CPU 81 is requested.

When determining in step S118 that the PDA 11 is requested to transmit the password, the CPU 81 proceeds to step S119, and transmits the stored password from the communication unit 89 to the personal computer 1.

In step S120, the CPU 81 determines whether or not the personal computer 1 has permitted the PDA 11 to connect. If the CPU 81 has determined that the personal computer 1 has not permitted, it returns to step S111, and repeatedly executes the subsequent processing. Conversely, if the CPU 81 has determined that the personal computer 1 has permitted the PDA 11, it proceeds to step S121, and establishes a connection and uses the communication unit 89 to transmit and receive information.

Figure 19:
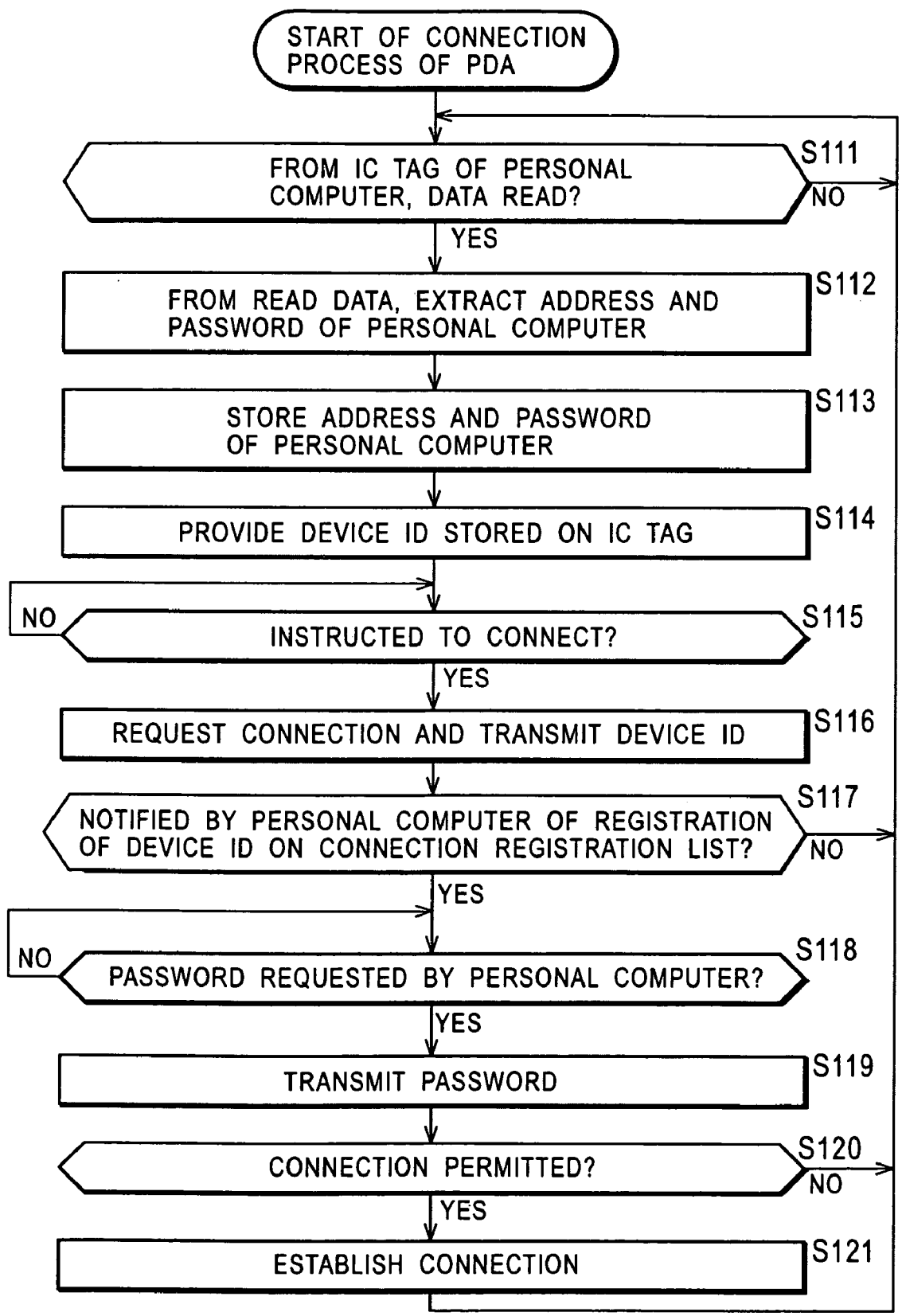
FIG. 19 is a flowchart illustrating the PDA in FIG. 18.

Next, a process of the personal computer 1 which is executed correspondingly to the process in FIG. 19 is described with reference to the flowchart in FIG. 20.

Figure 20:
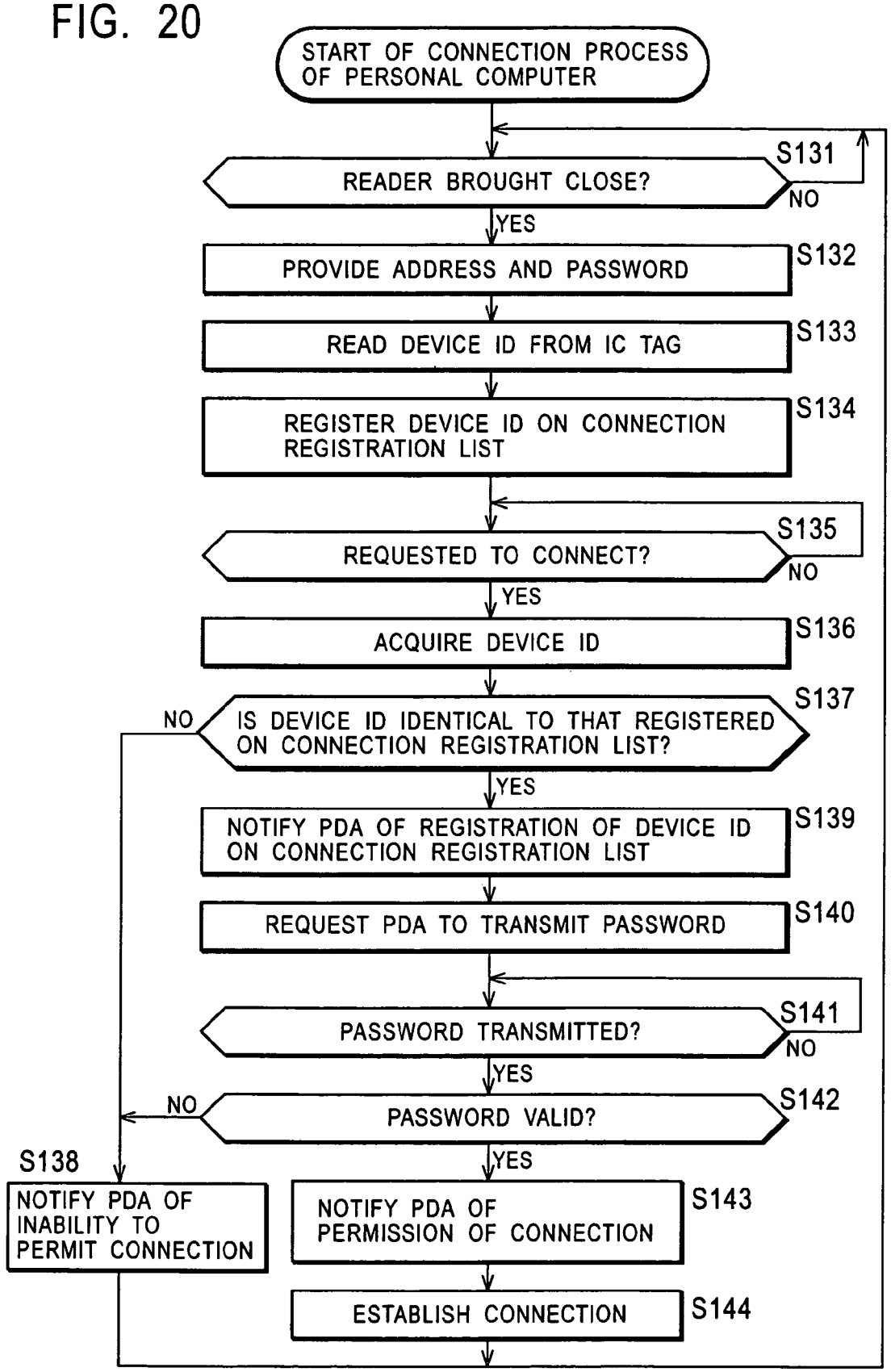
FIG. 20 is a flowchart illustrating a process of the personal computer in FIG. 17.

The process shown in FIG. 20 is basically a combination of the processes described with reference to FIG. 6, FIG. 9, and FIG. 14.

In step S131, a CPU of the IC tag 141 determines whether the reader 151 of the PDA 11 is positioned nearby. If the CPU has determined that the reader 151 is positioned nearby, it proceeds to step S132, and provides the PDA 11 (the reader 151) with the information stored in the flash memory, such as the address, and the password.

In step S133, the CPU 21 controls the reader 2 to read the device ID stored on the IC tag 12 of the PDA 11. The CPU 21 proceeds to step S134, and registers the device ID on the connection permission list.

In step S135, the CPU 21 determines whether or not a connection to the personal computer 1 is requested by the PDA 11. If the CPU 21 has determined that the personal computer 1 is requested, it proceeds to step S136 and acquires the device ID transmitted from the PDA 11.

In step S137, by referring to the connection permission list, the CPU 21 determines whether or not the transmitted device ID is registered on the connection permission list, that is, whether or not to permit the PDA 11 to connect.

When determining in step S137 that the transmitted device ID is not registered on the connection permission list, the CPU 21 proceeds to step S138, and notifies the device having transmitted the device ID that a connection cannot be permitted. After that, the process returns to step S131 and repeatedly executes the subsequent processing.

Conversely, when determining in step S137 that the transmitted device ID is registered on the connection permission list, the CPU 21 proceeds to step S139, and notifies the PDA 11 that the device ID is registered on the connection permission list.

Processing from step S140 to step S144 is similar to processing in step 84 to step 86, step S88, and step S89.

Specifically, in step S140, the CPU 21 requests the PDA 11 to transmit a password.

In step S141, the CPU 21 determines whether or not the password is transmitted. If the CPU 21 has determined that the password is transmitted, it proceeds to step S142.

In step S142, by referring to the password provided from the IC tag 141, the CPU 21 determines whether or not the transmitted password is valid. If the CPU 21 has determined that the transmitted password is not valid, it proceeds to step S138, and notifies the PDA 11 that the personal computer 1 cannot permit the PDA 11 to connect.

When conversely determining in step S142 that the password is valid, the CPU 21 proceeds to step S143 and notifies the PDA 11 that the personal computer 1 permits the PDA 11 to connect.

After that, in step S144, the connection between the personal computer 1 and the PDA 11 is established and various types of information are transmitted and received.

As described above, also by providing each of the personal computer 1 and the PDA 11 with an IC tag and a reader, connections from those other than a user who brings a device close to the personal computer 1 can be restricted, and authentication therefor (determination of whether or not the device is permitted to connect) is more complex, thus enabling unauthorized connections.

The above has mainly described a case in which the PDA 11 requests a connection to the personal computer 1 and the personal computer 1 authenticates the PDA 11. However, obviously, the personal computer 1 may conversely request a connection to the PDA 11. In this case, not only the PDA 11 authenticates the personal computer 1 by executing the above process of the personal computer 1, but also both the personal computer 1 and PDA 11 authenticate each other, whereby it may be determined whether or not each is permitted to connect.

Figure 21:
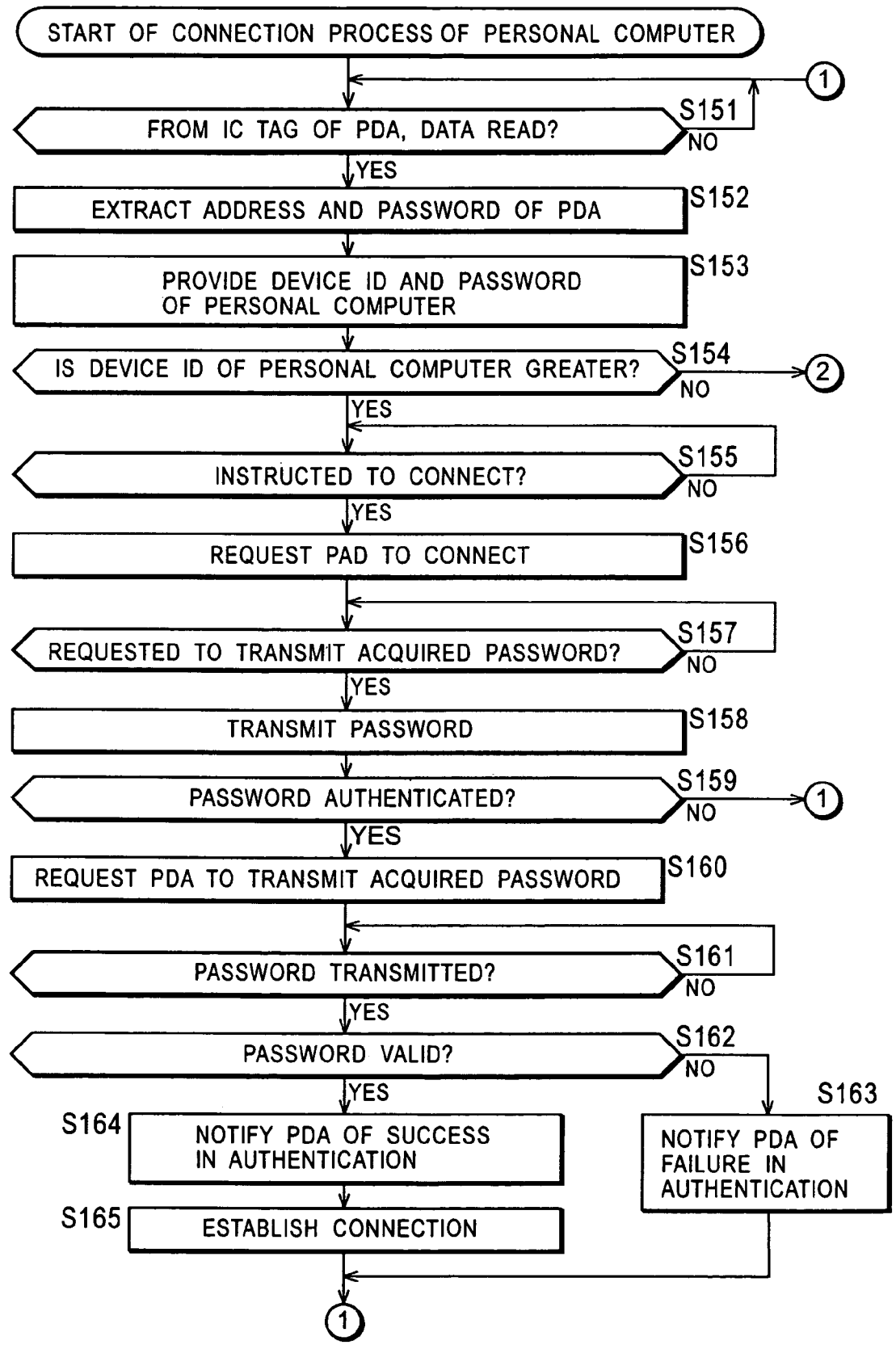
FIG. 21 is a flowchart illustrating another process of the personal computer in FIG. 17.
Figure 22:
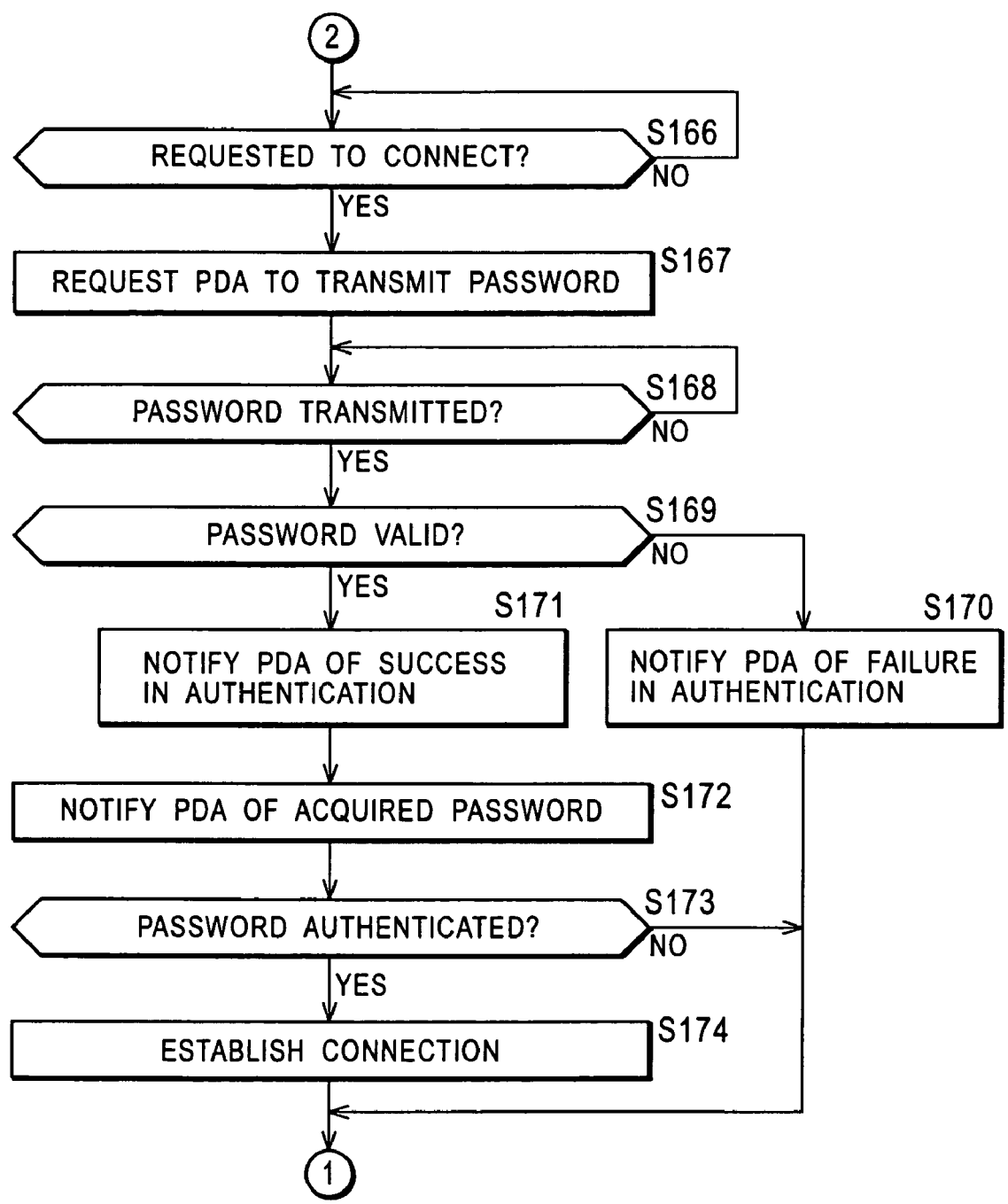
FIG. 22 is a flowchart continued from FIG. 21 which illustrates the other process of the personal computer in FIG. 17.

Next, a process in a case in which each of the personal computer 1 and the PDA 11 is provided with a reader and an IC tag and either one can request the other one is described with reference to the flowcharts in FIG. 21 and FIG. 22. Although FIG. 21 and FIG. 22 show a process of the personal computer 1, the PDA 11 also performs a similar process.

In step S151, the CPU 21 determines, based on an output from the reader 2, whether or not the reader 2 has read data from the IC tag 12 of the PDA 11, and is on standby until the CPU 21 determines that the reader 2 has read. When the PDA 11 is brought close, and the CPU 21 determines in step S151 that the PDA 11 has read the data, it proceeds to step S152, and extracts the device ID and address of the PDA 11 which are stored on the IC tag 12 of the PDA 11.

In step S153, the CPU 21 provides the PDA 11 with the device ID and password of the personal computer 1 which are stored on the IC tag 141. In other words, the reader 151 of the PDA 11 is used to read data stored on the IC tag 141.

In step S154, the CPU 21 compares the device ID of the personal computer 1 and the device ID of the PDA 11 read from the IC tag 12. When the device IDs each consist of a number having predetermined digits, it is determined whether or not the device ID of the personal computer 1 is greater.

In the process in FIG. 21 and FIG. 22, the device IDs are used to determine which device of the personal computer 1 and PDA 11 is to request a connection to the other. One device in which a greater device ID is set can request a connection to the other device.

In other words, when determining in step S154 that the device ID of the personal computer 1 is greater, the CPU 21 proceeds to step S155, and determines whether or not a connection to the personal computer 1 is requested by the user.

When determining in step S155 that the connection to the personal computer 1 is requested, the CPU 21 proceeds to step S156, and accesses the PDA 11 based on the address acquired from the IC tag 12 of the PDA 11 and requests a connection to the PDA 11.

In step S157, the CPU 21 determines whether or not the personal computer 1 is requested by the PDA 11 to transmit the password provided from the PDA 11, and is on standby until the CPU 21 determines that the personal computer 1 is requested.

When determining in step S157 that the personal computer 1 is requested to transmit the password, the CPU 21 proceeds to step S158, and transmits the password acquired from the IC tag 12 of the PDA 11 from the communication unit 29. The PDA 11 performs authentication (determination of whether or not the transmitted password is identical to the password provided by the PDA 11) based on the transmitted password, and posts the result.

In step S159, the CPU 21 determines whether or not the password is authenticated (whether or not the communication unit 29 has received a notification of authentication). If the CPU 21 has determined that the password has not been authenticated, it returns to step S151 since the PDA 11 refuses the connection, and executes the subsequent processing.

When conversely determining in step S159 that the password is authenticated, the CPU 21 proceeds to step S160, and conversely requests the PDA 11 to transmit the password read from the IC tag 141.

In step S161, the CPU 21 determines whether or not the PDA 11 has transmitted the password, and is on standby until the CPU 21 determines that the PDA 11 has transmitted the password.

When determining in step S161 that the password has been transmitted, the CPU 21 proceeds to step S162, and determines whether or not the transmitted password is valid. Specifically, the CPU 21 determines whether or not the password received by the communication unit 29 is identical to the password provided by the IC tag 141.

When determining in step S162 that the password transmitted from the PDA 11 is not valid, the CPU 21 proceeds to step S163, and notifies the PDA 11 of authentication failure and stops the connection to the PDA 11. After that, the CPU 21 returns to step S151, and executes the subsequent processing.

When determining in step S162 that the password is valid, the CPU 21 proceeds to step S164, and notifies the PDA 11 of authentication success. In step S165, the CPU 21 establishes the connection to the PDA 11. After that, predetermined information is transmitted and received between the personal computer 1 and the PDA 11.

In step S154, conversely, if the CPU 21 has determined that the device ID of the personal computer 1 is not greater than (less than) the device ID read from the IC tag 12 of the PDA 11, it proceeds to step S166.

This case causes the PDA 11 to request a connection to the personal computer 1. In step S166, the CPU 21 determines whether or not the PDA 11 has requested the connection to the personal computer 1, and is on standby until the CPU 21 determines that the PDA 11 has requested a connection to the personal computer 1.

When determining in step S166 that the PDA 11 has requested the connection to the personal computer 1, it proceeds to step S167, and requests the PDA 11 to transmit the password (the password provided from the personal computer 1) read from the IC tag 141.

In step S168, the CPU 21 determines whether or not the PDA 11 has transmitted the password, and is on standby until the PDA 11 has transmitted the password. When determining in step S168 that the PDA 11 has transmitted the password, the CPU 21 proceeds to step S169, and determines, by confirming the password transmitted from the PDA 11 and the password provided from the IC tag 141, whether or not the transmitted password is valid (whether or not both passwords are identical).

When determining in step S169 that the password is not valid, the CPU 21 proceeds to step S170, and notifies the PDA 11 of authentication failure. After that, the process returns to step S151, and repeatedly executes the subsequent processing.

When conversely determining that the password is valid, the CPU 21 notifies the personal computer 1 of authentication success in step S171, and proceeds to step S172. The CPU 21 uses the communication unit 29 to transmit the password read from the IC tag 12 of the PDA 11.

The PDA 11 performs authentication based on the transmitted password, and notifies the personal computer 1 of the result.

In step S173, the CPU 21 determines whether or not the PDA 11 has authenticated the password. If the CPU 21 has determined that the PDA 11 has not authenticated the password, it returns to step S151, and repeatedly executes the subsequent processing.

When determining in step S173 that the PDA 11 has authenticated the password, the CPU 21 proceeds to step S174. The CPU 21 establishes a connection to the PDA 11, and transmits and receives various types of information.

As described above, based on device IDs, by determining device that initiates connection requests, the connection requests can be prevented from conflicting.

Obviously, even if each of the personal computer 1 and the PDA 11 is provided with readers and IC tags, both devices are controlled to execute device ID management as described with reference to FIG. 10, and also to execute password change as described with reference to FIG. 15, etc.

In the foregoing, the reader 2 (IC tag 141) of the personal computer 1 and the IC tag 12 (reader 151) of the PDA 11 are used to transmit and receive information such as a device ID, an address, and a password in the form of electromagnetic waves. However, in a case in which the function is achieved by bringing both devices close to each other, for example, various communication methods such as, for example, IrDA can be used.

Although in the foregoing the tag and the reader are constituted by separate modules, both may be constituted by a single module.

In the foregoing, establishment of communication by Bluetooth is performed based on, for example, information such as device IDs which is transmitted and received between the reader 2 provided in the personal computer 1 and the IC tag 12 provided in the PDA 11. However, even if the personal computer 1 and the PDA 11 each are not provided with a module that uses electromagnetic induction to perform short distance wireless communication, by controlling the output power of radio waves from a communication unit (e.g., the communication unit 89 of the PDA 11), communication can be initiated only between close devices.

A communication system that specifies another terminal in communication and initiates communication between close devices by controlling the output power of radio waves output from a wireless communication unit is described below.

Figure 23:
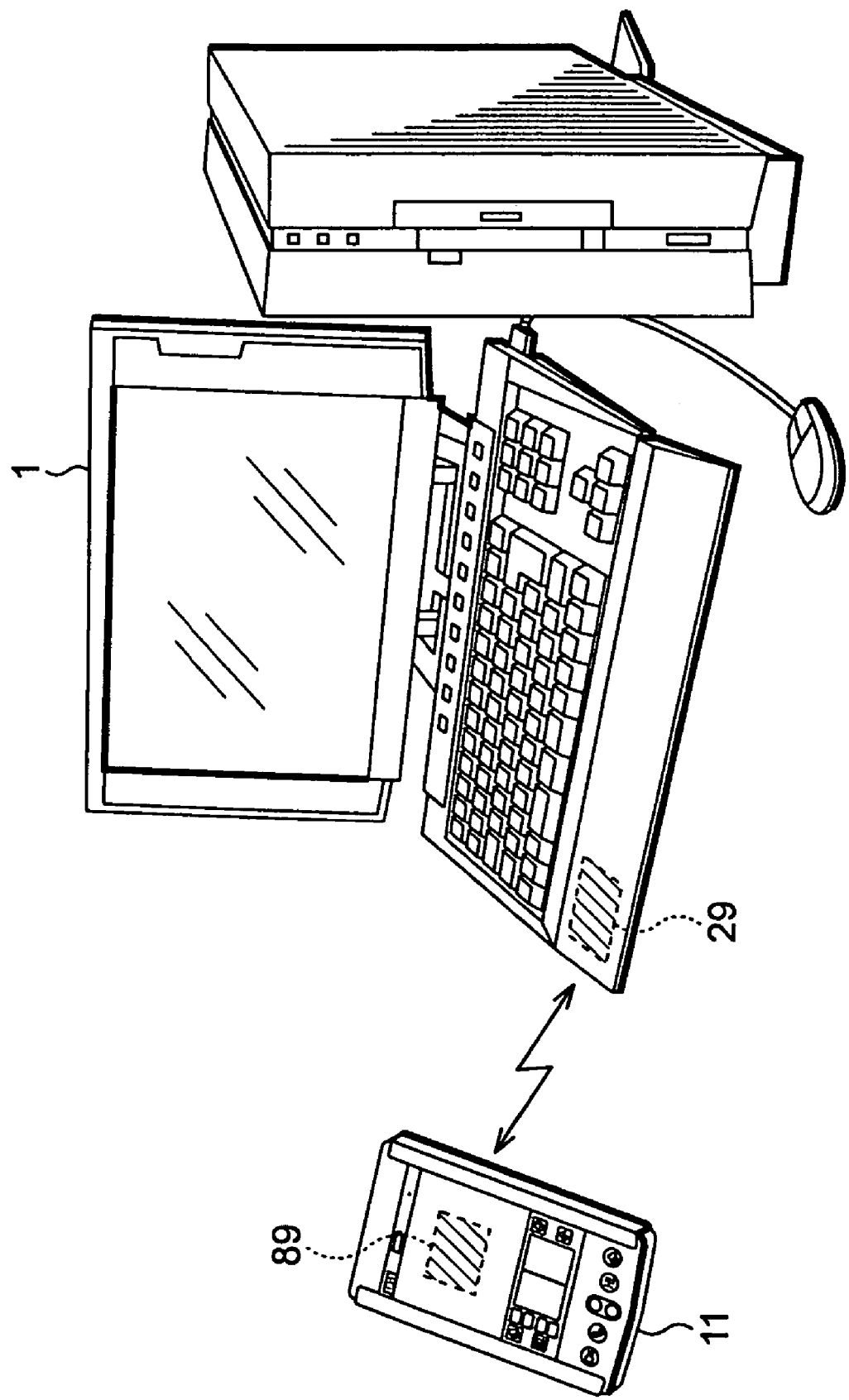
FIG. 23 is an illustration of an example of a communication system.

FIG. 23 is an illustration of an example of the communication system.

By way of example, in the case of specifying another device in communication using Bluetooth and establishing communication with the device, the PDA 11 firstly suppresses the output power of the communication unit 89 (e.g., a Bluetooth module) and controls radiated radio waves to reach, for example, within a several centimeter range.

In such a state in which a very weak power mode for suppressing the output power of radio waves is set, the communication unit 89 repeatedly performs "Inquiry", and searches for a terminal positioned in a range (e.g., within a several centimeter range) in which the radio waves reach.

When the PDA 11 is brought close to or put on the personal computer 1 by the user, and the radio waves radiated by the communication unit 89 are received by the communication unit 29 (a module for performing communication in accordance with the same specifications as the communication unit 89) of the personal-computer 1, the communication unit 29 responds to the Inquiry. Thus, the communication unit 89 establishes a communication link by performing "Inquiry, Page"(calling) with the communication unit 29. The established communication link is effective in a very narrow range reachable by radio waves from the communication unit 89 in which the very weak power mode is set.

Accordingly, after the communication unit 89 temporarily breaks the communication link and changes the very weak power mode to a normal power mode in order to enable communication with the communication unit 29, even if there is some distance therebetween, the communication unit 89 re-establishes a communication link with the communication unit 29, based on already acquired information (information acquired by the "Inquiry, Page"in a short distance).

The re-established communication link is effective in a range of several tens of meters, etc., in which radio waves reach, similarly to communication in accordance with Bluetooth, and enables Bluetooth communication, even if the distance between the personal computer 1 and the PDA 11 is sufficiently large.

As described above, even if the personal computer 1 and the PDA 11 are not provided with wireless modules using electromagnetic induction, by controlling the output power of the communication unit, simply bringing the PDA 11 close to the personal computer 1 by the user can establish Bluetooth communication between those terminals so that various types of information, such as a device ID, an address, and a password, can be transmitted and received.

In other words, in this case, when the PDA 11, in which the very weak power mode is set, is brought close to the personal computer 1, Bluetooth communication in accordance with the very weak power mode is established, and in the communication, for example, a device ID is transmitted from the PDA 11 (the communication unit 89) and is registered in the personal computer 1 (the communication unit 29).

After that, when the PDA 11 is instructed to connect to the personal computer 1 by the user, the normal power mode is set as the power mode in the communication unit 89 of the PDA 11, and authentication using a device ID is performed between the PDA 11 and the personal computer 1 is performed. Subsequently, Bluetooth communication in accordance with the normal power mode is established.

Accordingly, even if a plurality of devices that can perform communication using Bluetooth are positioned around the personal computer 1, users who can establish connections to the personal computer 1 by using their own device are only those who have recorded the device ID in the personal computer 1 by bringing their own device close to the personal computer 1 and performing communication in accordance with the very weak power mode.

As described above, in the case of using information such as a password in authentication, an address and a password are transmitted and received between the personal computer 1 and the PDA 11 when the communication in accordance with the very weak power mode is established. After that, authentication based on the password is performed, and when the authentication is completed, communication in accordance with the normal power mode is initiated.

Also, when the communication in accordance with the very weak power mode is established, an exterior image of a device that initiates communication, or an image indicating data to be transferred are transmitted and received, and are displayed by each device, whereby the user can confirm processing (e.g., processing performed when communication in accordance with the normal power mode is established) beforehand which is performed between two devices between which communication is established.

When the power mode of the communication unit 89 can be seamlessly switched, the set power mode may be switched from the very weak power mode to the normal power mode without temporarily breaking the communication link established when the very weak power mode is set.

Figure 24:
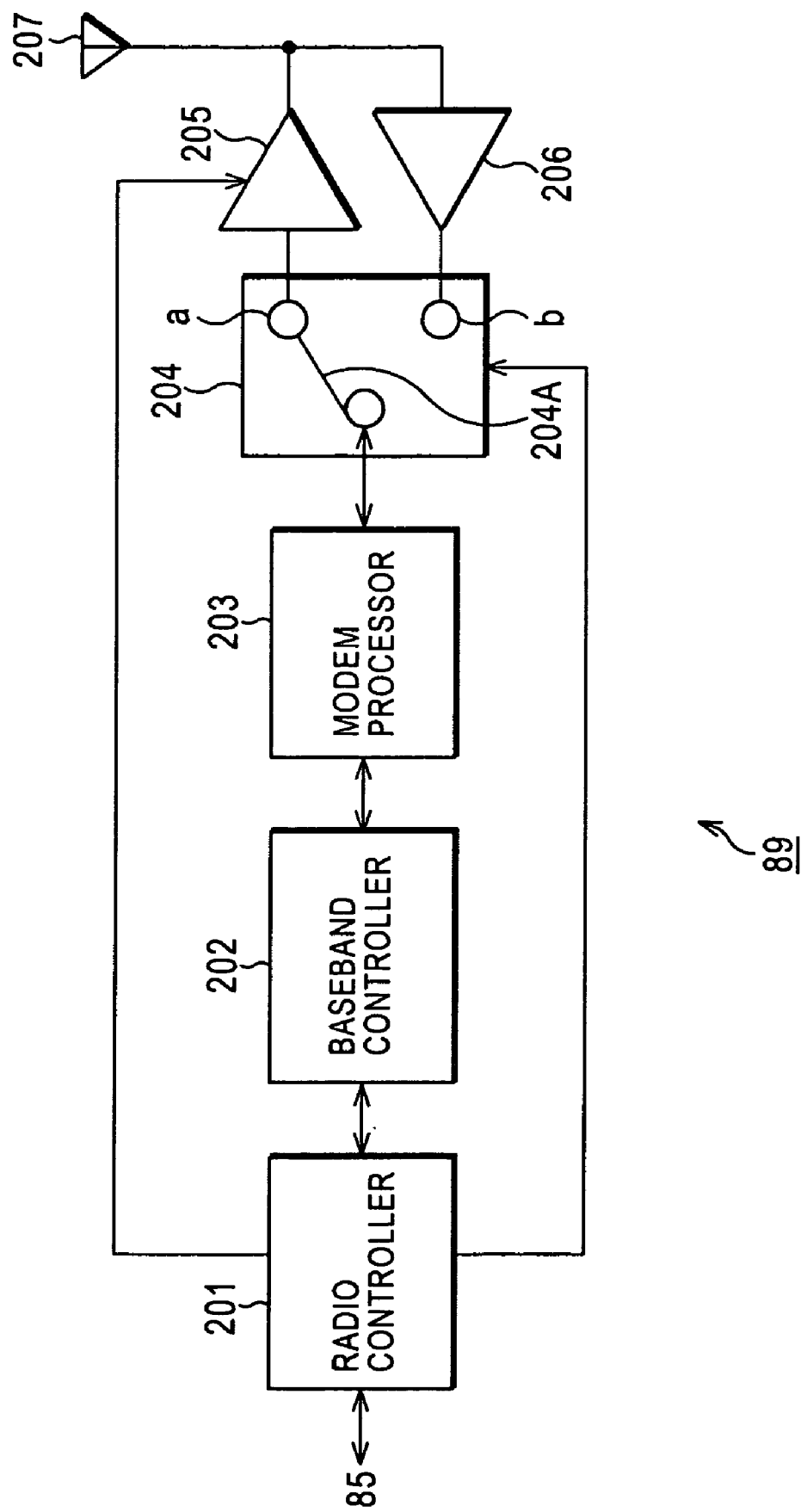
FIG. 24 is a block diagram showing an example of the communication unit in FIG. 23.

FIG. 24 is a block diagram showing a detailed example of the communication unit 89 in FIG. 23.

The communication unit 89 includes a Bluetooth module or a wireless LAN module.

A radio controller 201 controls a change-over switch 204. The radio controller 201 connects a switch 204A to contact a when transmitting information to an external terminal, while it connects the switch 204A to contact b when receiving information from the external terminal.

Based on control by the CPU 81 which is performed by using the input/output interface 85 (FIG. 4), the radio controller 201 controls a reachable range (output power) of radio waves radiated from an antenna 207 by controlling the gain of a power amplifier 205.

Specifically, when being instructed by the CPU 81 to be set to have the very weak power mode, the radio controller 201 controls the gain of the power amplifier 205 so that the reachable range of the radio waves radiated from the antenna 207 is narrowed. Also, when another terminal in communication can be specified and the very weak power mode is instructed to switch to the normal power mode, the radio controller 201 controls the gain of the power amplifier 205 so that the reachable range of the output radio waves is broadened.

A baseband controller 202 controls a baseband signal in a transmitted/received signal. A modem processor 203 performs, on an output from the baseband controller 202, FGSK modulation processing and spread spectrum processing based on a hopping frequency, and outputs the obtained signal from the antenna 207 through the power amplifier 205. The modem processor 203 performs inverse spread spectrum processing and GFSK demodulation processing on an output from an LNA (Low Noise Amplifier) 206, and outputs the obtained signal to the baseband controller 202.

Since the structure of the communication unit 29 provided in the personal computer 1 is similar to that of the communication unit 89 shown in FIG. 24, a description thereof is omitted.

As described above, in the communication system shown in FIG. 23, the personal computer 1 and the PDA 11 are not provided with a reader, an IC tag, etc.

Figure 25:
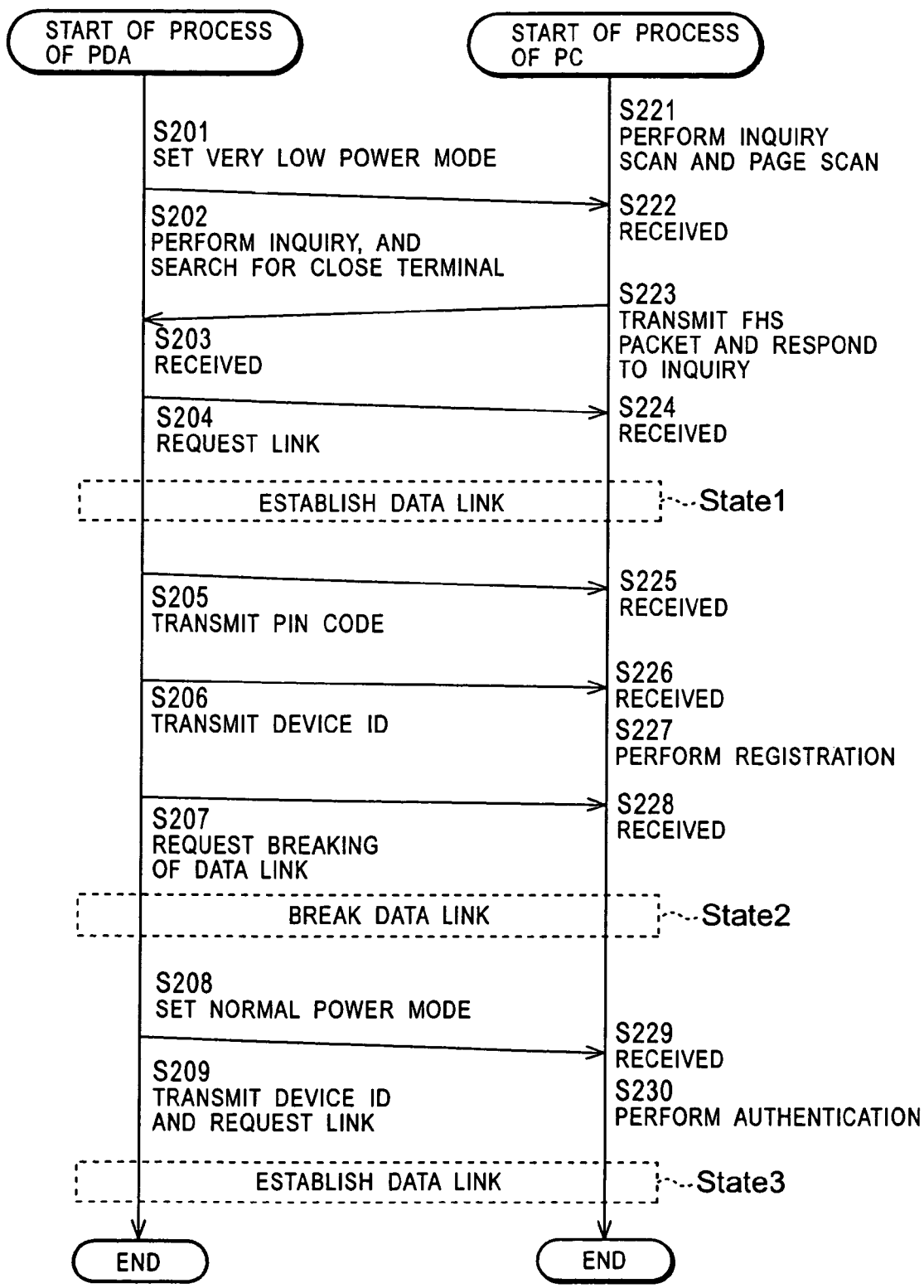
FIG. 25 is a flowchart illustrating the operation of the communication system in FIG. 23.

Next, the operation of the communication system in FIG. 23 is described with reference to the flowchart in FIG. 25. FIG. 25 illustrates processing which establishes communication in accordance with Bluetooth by using a device ID and which corresponds to FIG. 6 to FIG. 9.

By way of example, when the user instructs the PDA 11 to initiate communication in accordance with Bluetooth, the communication unit 89 of the PDA 11 is activated based on control by the CPU 81. In step S201, the communication unit 89 sets the very weak power mode therein as its power mode. The communication unit 89 proceeds to step S202, and searches for a close terminal by repeatedly executing the Inquiry.

In the Inquiry executed in step S202, an IQ packet (Inquiry packet) is repeatedly broadcasted in a range of, for example, several centimeters from the antenna 207 because the very weak power mode is set to suppress the reachable range of the radio waves.

In addition, in step S221, the communication unit 29 of the personal computer 1 is set to be in a state of repeatedly executing an Inquiry scan and a Page scan, and is on standby until it receives Inquiry and Page requests from another terminal.

When the user brings the PDA 11 close to the personal computer 1, and the communication unit 29 of the personal computer 1 is positioned in the reachable range of the radio waves from the communication unit 89 of the PDA 11, the IQ packet broadcasted from the communication unit 89 is received by the communication unit 29 in step S222.

When receiving the IQ packet broadcasted by the communication unit 89, the communication unit 29 proceeds to step S223, and transmits an FHS packet to the communication unit 89. The FHS packet includes, as (Bluetooth slave) attribute information of the personal computer 1, information representing the Bluetooth address and Bluetooth clock of the personal computer 1.

When receiving the FHS packet transmitted from the communication unit 29 in step S203, the communication unit 89 proceeds to step S204, and requests a link to the communication unit 29.

In other words, when an ID packet is transmitted from the communication unit 89 to the communication unit 29, and an ID packet identical to the above ID packet is sent back from the communication unit 29 to the communication unit 89, an FHS packet which includes the Bluetooth address and Bluetooth clock of the communication unit 89 is transmitted from the communication unit 89 to the communication unit 29.

When, in step S224, the FHS packet transmitted from the communication unit 89 is received by the communication unit 29, synchronization in frequency domain (frequency hopping pattern) and time domain (time slot) is established between the communication unit 89 and the communication unit 29, thus establishing a data link (communication link) (State 1).

For example, when a data link in accordance with Bluetooth is established between the communication unit 29 and the communication unit 89 for the first time, in step S205, the communication unit 89 transmits a PIN (Personal Identification Number) code to the communication unit 29, and mutual authentication is performed.

In step S225, the PIN code transmitted from the communication unit 89 is received by the communication unit 29. After that, various link keys based on the PIN code and random numbers are set between the communication unit 89 and the communication unit 29.

The transmission and reception of the PIN code may be performed after the PIN code is encrypted by using a public key provided from the communication unit 29 to the communication unit 89. In other words, in this case, the communication unit 29 manages a secret key corresponding to the public key provided to the communication unit 89 by itself. This can enhance security, and it is more ensured that communication in accordance with Bluetooth can be executed only between the personal computer 1 and the PDA 11.

In step S206, the communication unit 89 transmits the device ID set in the PDA 11 to the communication unit 29.

In step S226, the device ID transmitted from the communication unit 89 is received by the communication unit 29, and, in step S227, is registered on the connection permission list managed by the personal computer 1.

The device ID registered in the personal computer 1 is used for authentication which is performed when communication in accordance with the normal power mode is initiated.

Because the communication link established as described above is effective in the range of several centimeters which is reached by the radio waves from the communication unit 89, in which the very weak power mode is set, in step S206, the communication unit 89 requests the communication unit 29 to temporarily break the data link so that communication with the communication unit 29 is possible, even if there is some distance therebetween. At this time, the information acquired in the steps, such as the Bluetooth address of the communication unit 29 and the PIN code, is stored in the communication unit 89.

When receiving the request in step S228, similarly to the communication unit 89, the communication unit 29 stores information which has been acquired, such as the Bluetooth address of the communication unit 89 and the PIN code, and breaks the data link (State 2).

When the PDA 11 is instructed to connect to the personal computer 1 again, the communication unit 89 sets, based on control by the CPU 101, the mode of output power to the normal power mode. This causes Bluetooth radio waves from the communication unit 89 to reach, for example, a range of several tens of centimeters.

Proceeding to step S209, based on the information stored just before the data link is broken, the communication unit 89 specifies the personal computer 1 as the other terminal in communication, and transmits the device ID and requests a connection to the communication unit 29.

When this request is received by the communication unit 29 in step S229, the CPU 21 proceeds to step S230, and determines whether or not the device ID transmitted by the communication unit 89 (the PDA 11) is registered on the connection permission list. When determining that the device ID is registered, the CPU 21 permits the PDA 11 to connect.

In other words, based on the information which is transmitted and received in communication in accordance with the very weak power mode, and is stored, both terminals are set, thus activating a state having a data link established between the communication unit 89 and the communication unit 29, that is, a state in which communication in accordance with Bluetooth can be performed, for example, in a range of several tens of centimeters which is reached by the radio waves from the communication unit 89, in which the normal power mode is set. (State 3)

As described above, even if the personal computer 1 and the PDA 11 are not provided with a reader and an IC tag, the user can register a set device ID of the PDA 11 in the personal computer 1 by simply bringing the PDA 11 close to the personal computer 1, and initiates communication in accordance with the normal power mode with the personal computer 1.

Although in the foregoing a device ID is transmitted from the PDA 11 to the personal computer 1 when communication in accordance with the very weak power mode is established, as FIG. 16 shows, information, such as an address and a password, is transmitted from the personal computer 1 to the PDA 11, and access is controlled based on the transmitted information.

Figure 26:
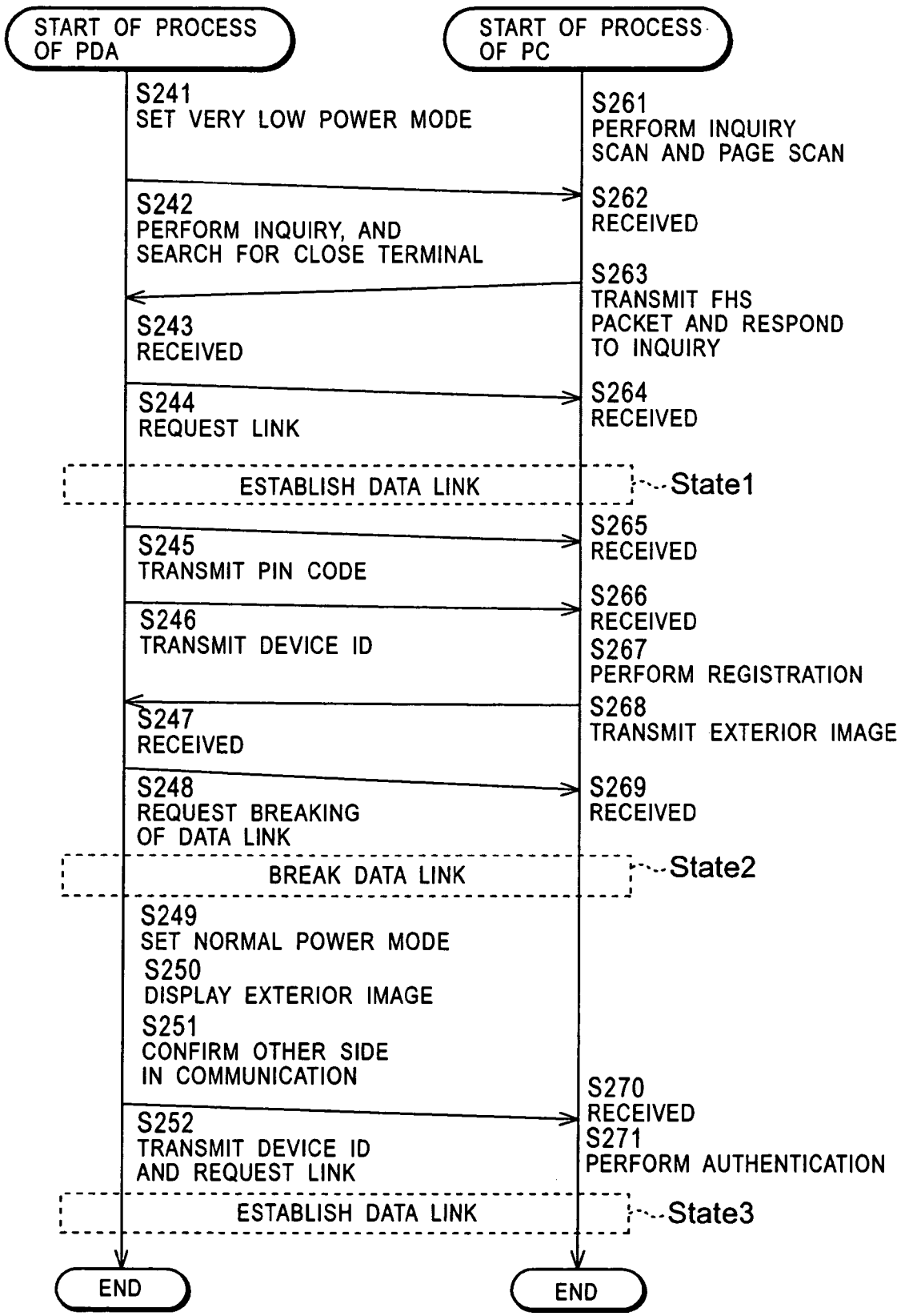
FIG. 26 is a flowchart illustrating another operation of the communication system in FIG. 23.

Next, processing in which, when communication in accordance with the very weak power mode is established, not only the information such as the above device ID, but also an exterior image indicating a device to be connected is transmitted and received and the image is displayed, is described with reference to the flowchart in FIG. 26.

In this example, when the communication in accordance with the very weak power mode is established, an exterior image of the personal computer 1 which is prepared beforehand can be transmitted from the personal computer 1 to the PDA 11.

Processing in steps S241 to S246 by the PDA 11, and processing in steps S261 to S267 by the personal computer 1 are similar to that in steps S201 to S206 in FIG. 25 and that in steps S221 to S227, respectively.

Specifically, the very weak power mode is used to establish a data link communicatable within a range of, for example, several centimeters, and the device ID transmitted from the communication unit 89 in the PDA 11 is received by the communication unit 29 in the personal computer 1.

When receiving the PIN code, in step S268, the communication unit 29 transmits, to the communication unit 89, the exterior image of the personal computer 1 which is prepared beforehand.

In step S247, the exterior image transmitted from the communication unit 29 is received by the communication unit 89, and is stored in the storage unit 88, or the like, of the PDA 11.

In step S248, the communication unit 89 requests the communication unit 29 to break the data link in accordance with the very weak power mode, and temporarily breaks the data link.

After that, when the PDA 11 is instructed to connect to the personal computer 1 by the user, the communication unit 89 proceeds to step S249, and sets the normal power mode based on control by the CPU 81.

In step S250, based on the stored image data, the CPU 81 controls the display unit 86 to display the exterior image of the personal computer 1. This enables the user to confirm beforehand a terminal as the other side in communication to which the data link in accordance with the normal power mode is established.

For example, in step S251, when the PDA 11 is instructed by the user to connect to the personal computer 1, whose exterior image is displayed on the display unit 86, the communication unit 89 proceeds to step S252, and transmits the device ID and requests a link to the communication unit 29 in accordance with the normal power mode.

When the request is received by the communication unit 29 in step S270, and device ID authentication is completed, the data link in accordance with the normal power mode is established (State 3).

As described above, based on the data transmitted when the data link in accordance with the very weak power mode is established, the exterior image of the terminal is displayed, whereby it is more ensured that communication with the terminal as the other side in communication which is desired by the user can be established.

Although in the foregoing an exterior image is transmitted as information representing a device as the other side in communication when communication in accordance with the very weak power mode is established, not only the image, but also various types of characteristic information, such as the name of the device as the other side in communication, may be displayed for the user.

In addition, audio information concerning the device as the other side in communication is transmitted, and audio guidance based thereon is output, whereby, even if a device which receives the audio information includes no display unit, information concerning the device to be connected can be presented for the user beforehand.

Although the above consecutive processing can be executed by hardware, it can be executed by software.

In the case of using software to execute the consecutive processing, programs constituting the software are installed from a network or recording media into, for example, a computer built into dedicated hardware, or a general-purpose personal computer in which, by installing various programs, various functions can be executed.

As FIG. 2 shows, the recording media include, not only package media constituted by a magnetic disk 31 (including a floppy disk), an optical disk 32 (CD-ROM (Compact Disk-Read Only Memory) and a DVD (Digital Versatile Disk), a magneto-optical disk 33 (including MD (registered trademark (Mini-Disk)), etc., which are distributed separately from the device body in order to provide programs to users, but also the ROM 22, in which a program is recorded, and a hard disk included in the storage unit 28, which are provided to users in a state incorporated beforehand in the device body.

In this Specification, the steps that describe programs recorded on the recording media obviously include time-series processes performed in described order, and also include processes executed in parallel or separately.

Also, in this Specification, the system means the entirety of an device constituted by a plurality of devices.

INDUSTRIAL APPLICABILITY

According to the present invention, simple and secure restricted access can be performed.

The invention claimed is:

1. A communication system comprising an information processing terminal and an information processing device, wherein:
   the information processing terminal comprises:
      first providing means for automatically providing, a first time, identification information of the information processing terminal by wireless communication to the information processing device, upon positioning the information processing terminal in proximity with the information processing device and before registering the information processing terminal;
      first acquiring means for acquiring, from the information processing device, communication information for performing communication with the information processing device by wireless communication, and a password; and
      first communication means for performing wired or wireless communication with the information processing device, wherein:
         when an instruction to connect to the information processing device is given, said first communication means accesses the information processing device based on the communication information acquired by said first acquiring means, transmits the identification information a second time and the password to the information processing device, and performs communication when communication is permitted by the information processing device based on the transmitted identification information and password, wherein:
   the information processing device comprises:
      second providing means for providing predetermined information by wireless communication to the information processing terminal, which is positioned nearby;
      second acquiring means for acquiring, the first time, the identification information from the information processing terminal by wireless communication;
      first storage means for registering the information processing terminal by storing the identification information acquired by said second acquiring means;
      second communication means for performing wired or wireless communication with the information processing terminal; and
      second storage means for storing the communication information for performing communication by said second communication means and the password, wherein:
   the second providing means provides, as the predetermined information, the communication information and password stored in the second storage means to the information processing terminal; and
   the second communication means performs communication with the information processing terminal when said second communication means receives the identification information the second time and the password transmitted from the information processing terminal, and it is determined that:
      the identification information received the second time is identical to the stored identification information received the first time; and
      the received password is identical to the password stored in said second storage means.

2. A communication method for a communication system comprising an information processing terminal and an information processing device, wherein:
   an information processing method for the information processing terminal comprises:
      automatically providing, a first time, identification information of the information processing terminal by wireless communication to the information processing device, upon positioning the information processing terminal in proximity with the information processing device and before registering the information processing terminal;
      acquiring, from the information processing device, communication information for performing communication with the information processing device by wireless communication, and a password;
      performing wired or wireless communication with the information processing device;
      accessing, when an instruction to connect to the information processing device is given, the information processing device based on the communication information;
      transmitting the identification information a second time and the password to the information processing device; and
      communicating with the information processing device when communication is permitted based on the transmitted identification information and password, wherein:
   an information processing method for the information processing device comprises:
      providing predetermined information including the communication information and the password by wireless communication to the information processing terminal, which is positioned nearby;
      acquiring, the first time, the identification information from the information processing terminal by wireless communication;
      storing the identification information to register the information processing terminal;
      performing wired or wireless communication to the information processing terminal; and
   storing the communication information for performing the wired or wireless communication to the information processing terminal and the password; and
   communicating with the information processing terminal if:
      the identification information received the second time is identical to the stored identification information received the first time; and
      the received password is identical to the password stored by the information processing device.

3. A computer-readable medium comprising instructions which, when executed by a processor, perform a communication method for a communication system comprising an information processing terminal and an information processing device, wherein the method comprises:

an information processing method for the information processing terminal, including:
- automatically providing, a first time, identification information of the information processing terminal by wireless communication to the information processing device, upon positioning the information processing terminal in proximity with the information processing device and before registering the information processing terminal;
- acquiring, from the information processing device, communication information for performing communication with the information processing device by wireless communication and a password;
- performing wired or wireless communication with the information processing device;
- accessing, when an instruction to connect to the information processing device is given, the information processing device based on the communication information;
- transmitting the identification information a second time and the password to the information processing device; and
- communicating with the information processing device when communication is permitted based on the transmitted identification information and password; and an information processing method for the information processing device, including:
- providing predetermined information including the communication information and the password by wireless communication to the information processing terminal, which is positioned nearby;
- acquiring, the first time, the identification information from the information processing terminal by wireless communication;
- storing the identification information to register the information processing terminal;
- performing wired or wireless communication to the information processing terminal; and
- storing the communication information for performing the wired or wireless communication to the information processing terminal and the password; and communicating with the information processing terminal if:
- the identification information received the second time is identical to the stored identification information received the first time; and
- the received password is identical to the password stored by the information processing device.

* * * * *